United States Patent
Tojo

(10) Patent No.: US 9,677,532 B2
(45) Date of Patent: Jun. 13, 2017

(54) IGNITION CONTROL DEVICE AND IGNITION CONTROL METHOD

(71) Applicant: SHINDENGEN ELECTRIC MANUFACTURING CO., LTD., Tokyo (JP)

(72) Inventor: Tokuzo Tojo, Hanno (JP)

(73) Assignee: SHINDENGEN ELECTRIC MANUFACTURING CO., LTD., Tokyo (JP)

( * ) Notice: Subject to any disclaimer, the term of this patent is extended or adjusted under 35 U.S.C. 154(b) by 218 days.

(21) Appl. No.: 14/402,158

(22) PCT Filed: Dec. 9, 2013

(86) PCT No.: PCT/JP2013/082953
§ 371 (c)(1),
(2) Date: Nov. 19, 2014

(87) PCT Pub. No.: WO2014/097914
PCT Pub. Date: Jun. 26, 2014

(65) Prior Publication Data
US 2015/0122239 A1    May 7, 2015

(30) Foreign Application Priority Data

Dec. 19, 2012  (JP) .................................. 2012-277123
Feb. 13, 2013  (JP) .................................. 2013-026086

(51) Int. Cl.
*F02P 3/04*        (2006.01)
*F02P 3/045*       (2006.01)
(Continued)

(52) U.S. Cl.
CPC ............. *F02P 3/0453* (2013.01); *F02P 1/083* (2013.01); *F02P 5/1502* (2013.01); *F02P 5/155* (2013.01);
(Continued)

(58) Field of Classification Search
CPC ........ F02P 1/083; F02P 3/0453; F02P 5/1502; F02P 5/155; F02P 7/07; F02P 7/077; F02P 9/002; Y02T 10/46
(Continued)

(56) References Cited

U.S. PATENT DOCUMENTS 4,088,107 A  *  5/1978  Chateau .................. F02P 3/051
                                                123/146.5 A
4,356,807 A  *  11/1982  Tokura ...................... F02P 3/01
                                                        123/606
(Continued)

FOREIGN PATENT DOCUMENTS

CN    102741544 A    10/2012
JP    6-42438        2/1994
(Continued)

OTHER PUBLICATIONS

Dec. 30, 2015 Office Action issued in Chinese Patent Application No. 201380030703.2 (with English-language translation).
(Continued)

*Primary Examiner* — Carlos A Rivera
*Assistant Examiner* — Carl Staubach
(74) *Attorney, Agent, or Firm* — Nixon & Vanderhye P.C.

(57) ABSTRACT

An ignition control device according to one embodiment of the present invention is configured to, based on a pulse signal to be induced in an ignition coil in accordance with rotation of an internal combustion engine, cause a voltage to be supplied to an ignition plug included in the internal combustion engine, to be generated in the ignition coil. The ignition control device includes: a switching element configured to energize the ignition coil; a biasing unit configured to bias control terminals of the switching element so that the switching element is turned on when the pulse signal is induced; a state detecting unit configured to detect a
(Continued)

biased state of the switching element; and a control unit configured to set a timing for controlling de-energization of the ignition coil in response to a result of detection performed by the state detecting unit, and to control the switching element to be turned off in accordance with the timing.

6 Claims, 14 Drawing Sheets

(51) Int. Cl.

| | | |
|---|---|---|
| F02P 1/08 | (2006.01) | |
| F02P 5/15 | (2006.01) | |
| F02P 7/077 | (2006.01) | |
| F02P 7/07 | (2006.01) | |
| F02P 5/155 | (2006.01) | |
| F02P 9/00 | (2006.01) | |

(52) U.S. Cl.
CPC .............. F02P 7/07 (2013.01); F02P 7/077 (2013.01); F02P 9/002 (2013.01); Y02T 10/46 (2013.01)

(58) Field of Classification Search
USPC ......... 123/406.12, 406.56–406.58, 599, 601, 123/605, 609, 629, 648, 650–652; 701/105, 110, 115
See application file for complete search history.

(56) References Cited

U.S. PATENT DOCUMENTS

| | | | | |
|---|---|---|---|---|
| 4,378,769 A * | 4/1983 | Haubner | ............ | F02P 1/083 123/335 |
| 4,398,516 A * | 8/1983 | Momoyama | ............ | F02P 1/086 123/406.57 |
| 4,515,118 A * | 5/1985 | Haubner | ............ | F02P 1/08 123/406.56 |
| 4,638,785 A * | 1/1987 | Matsui | ............ | F02P 3/0453 123/406.66 |
| 4,938,189 A * | 7/1990 | Morita | ............ | F02B 61/045 123/198 DC |
| 5,115,777 A * | 5/1992 | Ohki | ............ | F02D 45/00 123/198 D |
| 5,148,063 A * | 9/1992 | Hotta | ............ | G11C 7/14 327/56 |
| 5,180,984 A * | 1/1993 | Murata | ............ | F02P 17/12 123/406.26 |
| 5,220,903 A * | 6/1993 | Niemetz | ............ | F02P 15/12 123/651 |
| 5,345,903 A * | 9/1994 | Motose | ............ | F02D 7/02 123/198 D |
| 5,488,940 A * | 2/1996 | Kugler | ............ | F02P 3/053 123/644 |
| 8,985,090 B2 * | 3/2015 | Bolz | ............ | F02P 3/0442 123/618 |
| 2008/0007266 A1 * | 1/2008 | Enomoto | ............ | F02P 9/002 324/380 |
| 2012/0312285 A1 * | 12/2012 | Bolz | ............ | F02P 15/10 123/623 |
| 2014/0318488 A1 * | 10/2014 | Kawagoe | ............ | F02P 1/08 123/143 B |

FOREIGN PATENT DOCUMENTS

| | | |
|---|---|---|
| JP | 10-54332 | 2/1998 |
| JP | 10-141190 | 5/1998 |
| JP | 11-270448 | 10/1999 |
| JP | 2005-307761 | 11/2005 |

OTHER PUBLICATIONS

International Search Report for PCT/JP2013/082953, mailed Mar. 4, 2014.

Dec. 21, 2016 Extended European Search Report issued in European Patent Application No. 13865415.7.

* cited by examiner

IGNITION CONTROL DEVICE AND IGNITION CONTROL METHOD

TECHNICAL FIELD

The present invention relates to an ignition control device and an ignition control method for an internal combustion engine. Particularly, the present invention relates to a technique for preventing erroneous ignition.

This application is the U.S. national phase of International Application No. PCT/JP2013/082953 filed Dec. 9, 2013 which designated the U.S. and claims priority to Japanese Patent Application No. 2012-277123 filed Dec. 19, 2012, and Japanese Patent Application No. 2013-026086 filed Feb. 13, 2013, the entire contents of each of which are incorporated herein by reference.

BACKGROUND ART

As an ignition control device for an internal combustion engine, there is an inductive-discharge-type (or current-shutdown-type) ignition control device requiring no external power source, such as a battery (Patent Document 1). According to the ignition control device, energization of an ignition coil (initiation and termination of energization) is controlled using a pulse induced in the ignition coil in accordance with rotation of the internal combustion engine. Then, a high voltage generated when the ignition coil is de-energized causes a spark plug to generate sparks, thus igniting a fuel mixture in a cylinder. Conventionally, an ignition control device of this type includes circuit elements, such as capacitors, resistors, zener diodes, and transistors. Additionally, a circuit constant is set at a design stage so as to obtain a desired ignition timing.

Additionally, an ignition device of this type is configured to operate using as a power supply, the power obtained from a pulse generated by the ignition coil, thus requiring no external power source, such as a battery.

CITATION LIST

Non-Patent Document

[Patent Document 1] Japanese Unexamined Patent Application, First Publication No. 2005-307761

DISCLOSURE OF THE INVENTION

Problems to be Solved by the Invention

According to the above-described related art, energization of the ignition coil is initiated in response to a negative pulse induced in the ignition coil. The energization is terminated when a predetermined time has elapsed from the initiation of the energization. Then, ignition is performed. At the initiation of the energization in response to a negative pulse, however, the energization of the ignition coil is initiated after the negative pulse starts to fall due to an operation delay or the like of the device. For this reason, there is a possibility that a negative pulse is temporarily generated after a negative pulse starts to fall and before the energization is initiated, thereby causing erroneous ignition due to the negative pulse.

The above problem will be described in detail with reference to FIG. 6. FIG. 6(a) is a diagram showing an example of a waveform of a pulse signal P to be induced in the ignition coil in accordance with the rotation of the internal combustion engine. FIG. 6(b) is a diagram showing an example of a waveform of the pulse signal P when the ignition coil 6 is energized.

As shown in FIG. 6(a), in each rotation cycle, a positive pulse P1, a negative pulse P2, and a positive pulse P3 are sequentially induced in the ignition coil, as the pulse signal P. In this example, the positive pulse P1 is induced in a period from time to corresponding to the initiation time of the rotation cycle to time tb. Then, the negative pulse P2 is induced in a subsequent period from time tc to time td. Then, the positive pulse P3 is induced in a subsequent period from time te to time tf. Among the pulses, the negative pulse P2 is used to perform the energization of the ignition coil.

Specifically, as shown in FIG. 6(b), operation to energize the ignition coil is initiated at the time tc, in response to a leading edge (falling edge) of the negative pulse P2. In the example shown in FIG. 6(b), the energization is initiated at time tca that is a predetermined time after the time tc at which the negative pulse P2 starts to fall. Then, the energization is continued until the energization is terminated at time tcb corresponding to the ignition timing. The period from the time tc at which the negative pulse P2 starts to fall to the time tca at which the energization is initiated is due to the operation delay of the device or the like. During this period, part of the negative pulse P2 is generated as a negative pulse P2a. Generally, a peak value of the negative pulse P2a is very small and therefore never affects the ignition operation.

However, for example, if the rotation speed of the internal combustion engine is increased, the fall of the negative pulse P2 becomes steeper, and thus the peak value of the negative pulse P2a increases. As the peak value of the negative pulse P2a increases, the energy generated by this negative pulse P2a is stored in the ignition coil. When the energization is initiated at the time tca, the energy generated by the negative pulse P2a and stored in the ignition coil is released, thereby generating a high voltage. Therefore, ignition is performed at a stage earlier than the time tcb that is the original ignition timing, thereby causing erroneous ignition to be likely to occur.

The present invention has an object to provide an ignition control device and an ignition control method, which can prevent erroneous ignition when a pulse is generated, thereby stabilizing the ignition timing.

Means for Solving the Problems

An ignition control device according to one embodiment of the present invention is configured to, based on a pulse signal to be induced in an ignition coil in accordance with rotation of an internal combustion engine, cause a voltage to be supplied to an ignition plug included in the internal combustion engine, to be generated in the ignition coil. The ignition control device includes: a switching element configured to energize the ignition coil; a biasing unit configured to bias control terminals of the switching element so that the switching element is turned on when the pulse signal is induced; a state detecting unit configured to detect a biased state of the switching element; and a control unit configured to set a timing for controlling de-energization of the ignition coil in response to a result of detection performed by the state detecting unit, and to control the switching element to be turned off in accordance with the timing.

In the ignition control device, for example, the biasing unit comprises a resistor element connected between a base and a collector of a transistor included in the switching element.

In the ignition control device, for example, the state detecting unit includes a dummy transistor configured to simulate a collector current of the transistor included in the switching element. A base and an emitter of the dummy transistor are connected respectively to the base and an emitter of the transistor included in the switching element.

In the ignition control device, for example, the state detecting unit is configured to detect the biased state of the switching element from a voltage between the base and the emitter of the transistor included in the switching element, or a direction of a current flowing through the ignition coil.

In the ignition control device, for example, the transistor included in the switching element comprises a multi-stage Darlington transistor.

In the ignition control device, for example, the pulse signal is a negative pulse to be induced in a primary winding of the ignition coil in accordance with the rotation of the internal combustion engine.

An ignition control device according to another embodiment of the present invention is configured to, based on a pulse signal to be induced in an ignition coil in accordance with rotation of an internal combustion engine, cause a voltage to be supplied to an ignition plug included in the internal combustion engine, to be generated in the ignition coil. The ignition control device includes: a power generating unit configured to generate from the pulse signal to be induced in the ignition coil, a power supply voltage required for the ignition control device to operate; a first pulse signal generating unit configured to generate a first pulse from the pulse signal to be induced in the ignition coil; a switching element configured to energize the ignition coil; a biasing unit configured to bias control terminals of the switching element so that the switching element is turned on when the pulse signal is induced; a state detecting unit configured to detect a biased state of the switching element; a second pulse signal generating unit configured to generate from a result of detection performed by the state detecting unit, a second pulse following the first pulse; a control unit configured to, in response to the first pulse and the second pulse, set a timing for controlling de-energization of the ignition coil, and control the switching element to be turned off in accordance with the timing; and a driving unit configured to drive the switching unit based on the ignition control signal.

An ignition control device according to another embodiment of the present invention is configured to, based on a pulse signal to be induced in an ignition coil in accordance with rotation of an internal combustion engine, cause a voltage to be supplied to an ignition plug included in the internal combustion engine, to be generated in the ignition coil. The ignition control device includes: a selecting unit configured to select one of a plurality of intermediate nodes; a control unit configured to have the selecting unit select one of the plurality of intermediate nodes in accordance with a rotation speed of the internal combustion engine; and a power generating unit configured to generate from a voltage of the intermediate node selected by the selecting unit, an operating power of the ignition control device.

In the ignition control device, for example, the control unit is configured to, in an initial state, have the selecting unit select from the plurality of intermediate nodes, an intermediate node in which a highest voltage is generated, and have the selecting unit sequentially select the plurality of intermediate nodes in order from the intermediate node in which the highest voltage is generated to an intermediate node in which a lowest voltage is generated.

In the ignition control device, for example, the selecting unit comprises a plurality of switches, one ends of the plurality of switches are connected respectively to the plurality of intermediate nodes, and other ends of the plurality of switches are commonly connected to an input unit of the power generating unit.

In the ignition control device, for example, among the plurality of switches, the intermediate node in which the highest voltage is generated is a normally open switch, and other switches are normally closed switches.

In the ignition control device, for example, the power generating unit includes: a clamping circuit configured to clamp at a constant voltage, a voltage of a pulse of the intermediate node selected by the selecting unit; and a voltage regulator circuit configured to lower the constant voltage obtained by the clamping circuit and obtain the operating power.

An ignition control method according to another embodiment of the present invention is an ignition control method of, based on a pulse signal to be induced in an ignition coil in accordance with rotation of an internal combustion engine, causing a voltage to be supplied to an ignition plug included in the internal combustion engine, to be generated in the ignition coil. The ignition control method includes: a step of biasing control terminals of a switching element configured to energize the ignition coil, so that the switching element is turned on when the pulse signal is induced; a step of detecting a biased state of the switching element; and a step of setting a timing for controlling de-energization of the ignition coil in response to a result of the detection, and controlling the switching element to be turned off in accordance with the timing.

An ignition control method according to another embodiment of the present invention is an ignition control method of, based on a pulse signal to be induced in an ignition coil in accordance with rotation of an internal combustion engine, causing a voltage to be supplied to an ignition plug included in the internal combustion engine, to be generated in the ignition coil. The ignition control method includes: a step for a controlling unit to have a selecting unit select one of a plurality of intermediate nodes set to the ignition coil, in accordance with a rotation speed of the internal combustion engine; and a step for a power generating unit to generate from a voltage of the intermediate node selected by the selecting unit, an operating power of the ignition control device.

Effects of the Invention

According to the aspects of the present invention, it is possible to suppress a change in voltage caused by the pulse induced in the ignition coil before energization. Thus, it becomes possible to prevent erroneous ignition and stabilize the ignition timing.

BRIEF DESCRIPTION OF THE DRAWINGS

FIG. 6(a) is a diagram showing an original waveform of a pulse signal when the ignition coil is not energized, and FIG. 6(b) is a diagram showing a waveform of a pulse signal when the ignition coil is energized.

BEST MODE FOR CARRYING OUT THE INVENTION

Hereinafter, embodiments of the present invention will be described with reference to the drawings.

First Embodiment [Description of Configuration]

Figure 1:
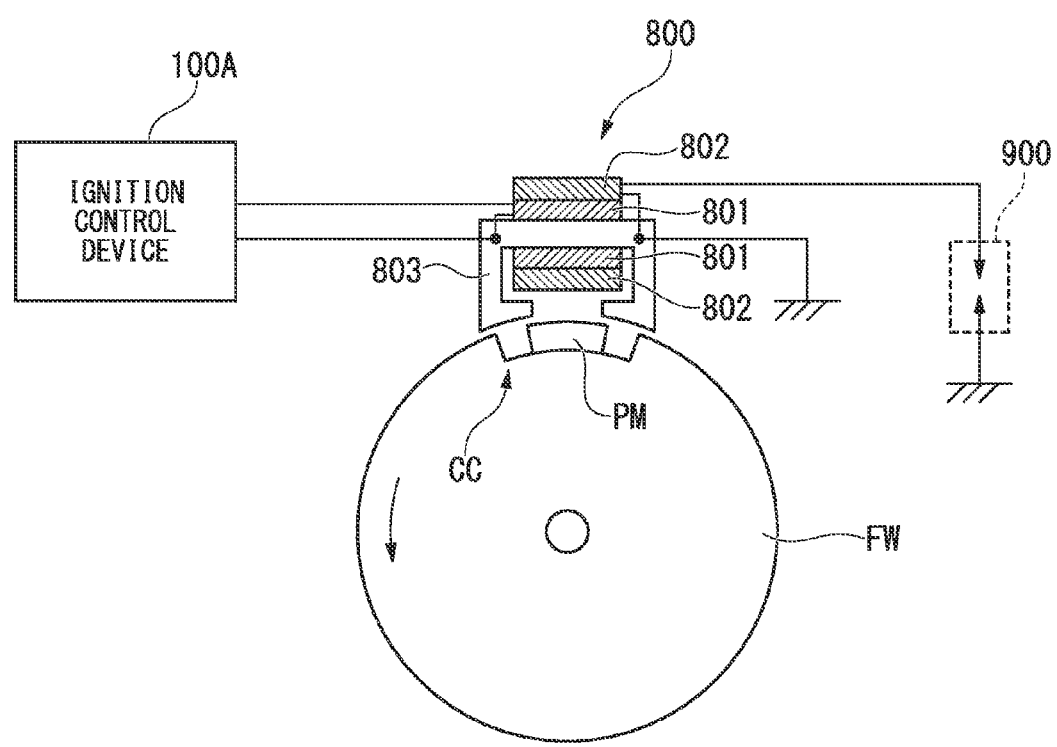
FIG. 1 is a diagram schematically showing an application example of an ignition control device according to a first embodiment of the present invention.

FIG. 1 is a diagram schematically showing an application example of an ignition control unit 100A according to a first embodiment of the present invention. The ignition control device 100A is connected to a primary winding 801 of an ignition coil 800 mounted on an internal combustion engine (not shown). A spark plug 900 is connected to a secondary winding 802 of the ignition coil 800. Both ends of a core 803 of the ignition coil 800 are disposed in proximity to an outer peripheral portion of a flywheel FW included in the internal combustion engine.

A recess CC is formed on the outer peripheral portion of the flywheel FW. The recessed portion CC is attached with a permanent magnet PM that generates a magnetic field to induce a pulse signal in the primary winding 801 of the ignition coil 800. When the flywheel FW attached with the permanent magnet PM is rotated, a change in magnetic flux in the core 803 of the ignition coil 800 causes first to third pulses P1 to P3 to be sequentially induced in the primary winding 801 of the ignition coil 800, as a pulse signal P shown in the above-described FIG. 6(a) or later-described FIG. 5, in each rotation cycle of the internal combustion engine. The first pulse P1 is a positive pulse. The second pulse P2 is a negative pulse. The third pulse P3 is a positive pulse.

In the present embodiment, an ignition timing of the internal combustion engine (discharge initiation timing of the spark plug 900) is set to be a timing specified by a predetermined rotation angle measured from the leading edge of the second pulse P2 that is a negative pulse (timing at which a piston of the internal combustion engine is located at the top dead center). Additionally, a de-energization timing of the ignition coil 800 matches the ignition timing. However, setting of the ignition timing is optional, and is not limited to the above-described example.

Here, in the present embodiment, in each rotation cycle, the pulse signal P is intended to include a pulse train including the first pulse P1, the second pulse P2, and the third pulse P3, but is not limited to this example. Pulses included in the pulse signal P are optional as long as the de-energization timing of the ignition coil 800 can be controlled.

Figure 2:
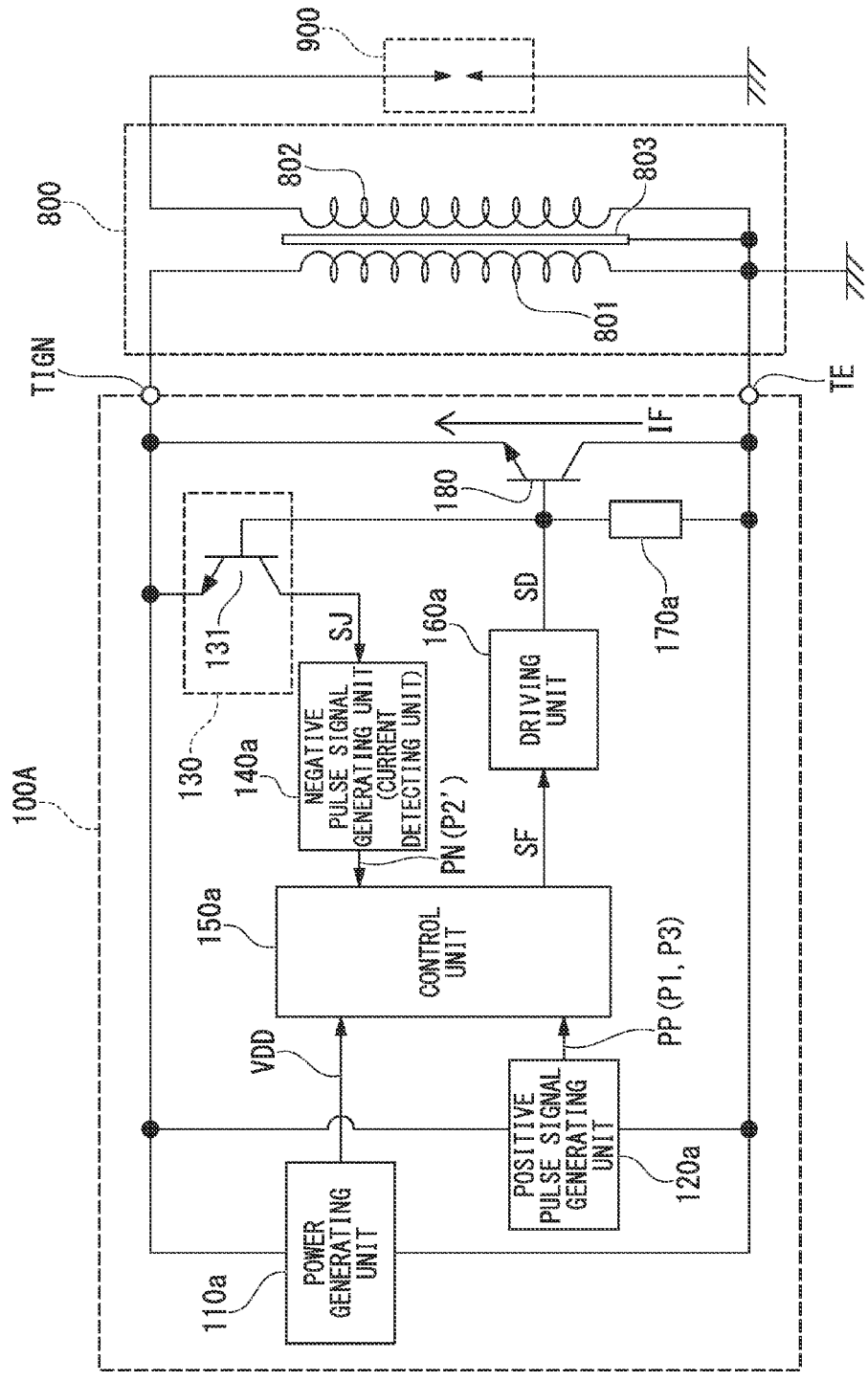
FIG. 2 is a functional block diagram showing an example of a configuration of the ignition control device according to the first embodiment of the present invention.

FIG. 2 is a functional block diagram showing an example of the configuration of the ignition control device 100A according to the present embodiment. Based on the pulse signal P induced in the primary winding 801 of the ignition coil 800 in accordance with the rotation of the internal combustion engine, the ignition control device 100A causes a voltage to be supplied to the ignition plug 900 included in the internal combustion engine, to be generated in the primary winding 801 of the ignition coil 800. The ignition control unit 100A includes a power generating unit 110a, a positive pulse signal generating unit 120a, a state detecting unit 130, a negative pulse signal generating unit 140a, a control unit 150a, a driving unit 160a, a biasing unit 170a, and a switching element 180.

Figure 5:
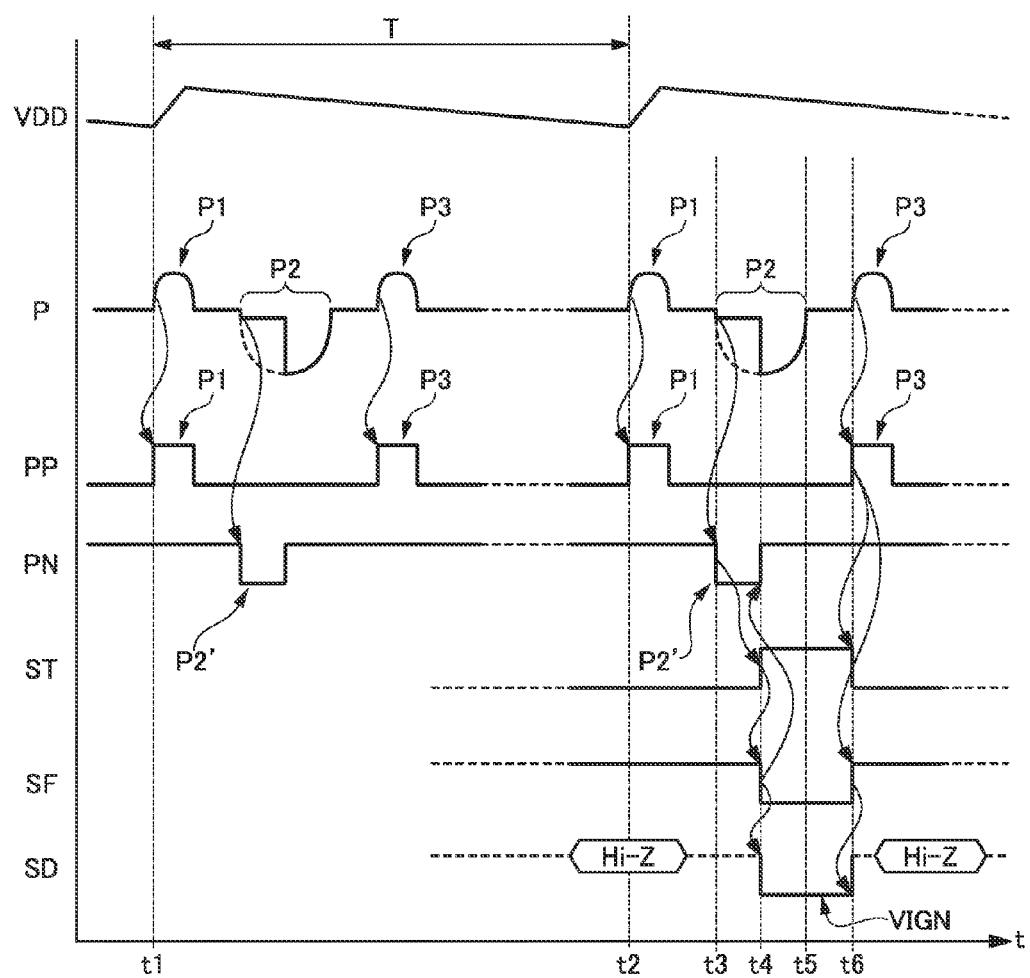
FIG. 5 is a timing chart illustrating the operation of the ignition control device according to the first embodiment of the present invention.

The power generating unit 110a is configured to generate a power supply voltage VDD required for the ignition control device 100A to operate using the first and third pulses P1 and P3 that are positive pulses of the pulse signal P induced in the primary winding 801 of the ignition coil 800. The primary winding 801 of the ignition coil 800 is connected to the power generating unit 110a via a terminal TIGN and a terminal TE. The power supply voltage VDD generated by the power generating unit 110a is supplied to the control unit 150a. Since the power supply voltage VDD is the voltage generated using the first and third pulses P1 and P3, if the pulses are lost, the power supply voltage VDD decreases over time, as illustrated in FIG. 5. However, the power supply voltage VDD is the voltage sufficient for the control unit 150a to perform required control operation in each rotation cycle.

Here, depending on the circuit types of the positive pulse signal generating unit 120a, the state detecting unit 130, the negative pulse signal generating unit 140a, the driving unit 160a, and the biasing unit 170a, the power supply voltage VDD may be supplied thereto.

The positive pulse signal generating unit 120a is configured to detect a positive pulse from the pulse signal P induced in the primary winding 801 of the ignition coil 800, thereby generating a positive pulse signal PP. The primary winding 801 of the ignition coil 800 is connected to the positive pulse signal generating unit 120a via the terminal TIGN and the terminal TE. The positive pulse signal PP generated by the positive pulse signal generating unit 120a includes the first and third pulses P1 and P3 that are positive pulses. This positive pulse signal PP is supplied to the control unit 150a. In the present embodiment, the positive pulse signal PP is used as a signal indicating the leading edges of the respective first and third pulses P1 and P3.

The state detecting unit 130 is configured to detect a biased state of the switching element 180. The state detecting unit 130 is configured to detect a state in which a control terminal of the switching element 180 is biased such that the switching element 180 is turned on, and to generate a detection signal SJ indicating a result of the detection. The detection signal SJ is supplied to the negative pulse signal generating unit 140a. In the present embodiment, the state detecting unit 130 includes a dummy transistor 131 to simulate a collector current of an npn-type transistor constituting the switching element 180. The state detecting unit 130 is configured to reflect the biased state (on-state) of the switching element 180 onto the collector current of the dummy transistor 131. Here, in the present embodiment, the dummy transistor 131 is an npn-type transistor similar to the switching element 180. A base and an emitter of the dummy transistor 131 are connected respectively to a base and an emitter of the npn-type transistor constituting the switching element 180. Thus, a base-emitter voltage of the dummy transistor 131 becomes the same as a base-emitter voltage of the npn-type transistor constituting the switching element 180. Thus, the collector current of the npn-type transistor constituting the switching element 180 is reflected in the collector current of the dummy transistor 131. Thus, the state detecting unit 130 simulates, using the dummy transistor 131, the collector current of the npn-type transistor constituting the switching element 180. Additionally, the state detecting unit 130 outputs the collector current of the dummy transistors 131 as a detection signal SJ indicating the biased state of the switching element 180 in the on-state. However, the configuration of the state detecting unit 130 is not limited to this example and may be optional as long as it is possible to detect the biased state when the switching element 180 is turned on.

The negative pulse signal generating unit 140a is configured to generate a negative pulse signal PN from the detection signal SJ indicating a result of the detection performed by the state detecting unit 130. In the present embodiment, the negative pulse signal generating unit 140a is configured as a current detecting unit that detects the collector current of the above-described dummy transistor 131. As a result of the detection, the negative pulse signal generating unit 140a generates a negative pulse signal PN and supplies the generated negative pulse signal PN to the control unit 150a. The negative pulse signal PN includes a pulse P2' corresponding to the second pulse P2 that is a negative pulse following the first pulse A leading edge of the pulse P2' substantially matches the leading edge of the second pulse P2. To the extent of that, the pulse P2' is a signal equivalent to the second pulse P2. In the present embodiment, the negative pulse signal PN is used as a signal indicating the leading edge of the second pulse P2.

The control unit 150a is configured to set a timing for controlling de-energization of the ignition coil 800 in response to the positive pulse signal PP and the negative pulse signal PN, and in accordance with the timing, control the switching element 180 to be turned off. In other words, the control unit 150a is configured to set a timing for controlling de-energization of the ignition coil 800 in response to the first pulse P1 included in the positive pulse signal PP and the second pulse P2 (pulse P2') included in the negative pulse signal PN. In the present embodiment, the first pulse P1 is used to calculate the rotation speed RS of the internal combustion engine to be referred to when the de-energization timing is set. Additionally, the second pulse P2 is used as a trigger signal for a process for setting the de-energization timing.

Additionally, the control unit 150a is configured to generate an ignition control signal SF for controlling the switching element 180 to be turned off in accordance with the above set timing. The ignition control signal SF is supplied to a control terminal of the driving unit 160a. The control unit 150a is implemented by, for example, a microcomputer that operates in accordance with a control program describing processing procedure related to ignition control, a dedicated digital control IC (integrated circuit) having a logical operation function equivalent to the processing procedure described by the above control program, or the like.

Here, in the present embodiment, the control unit 150a is assumed to generate the ignition control signal SF in response to both the positive pulse signal PP and the negative pulse signal PN. However, in a case where there is no need to consider the rotation speed RS of the internal combustion engine when the de-energization timing is set, and for example, a fixed timing is used as the de-energization timing, the ignition control signal SF may be generated using a predetermined fixed timing, in response not to the positive pulse signal PP, but only to the negative pulse signal PN based on the detection signal SJ indicating a result of the detection performed by the state detecting unit 130.

The driving unit 160a is configured to drive the switching element 180 based on the ignition control signal SF received from the control unit 150a. The driving unit 160a generates a driving signal SD for driving the switching element 180, in accordance with the signal level of the ignition control signal SF. The driving signal SD is supplied to the control terminal of the switching element 180. The driving unit 160a is configured to include, for example, an open-collector-type or open-drain-type output unit. In a case where the ignition coil 800 is energized, an output of the driving unit 160a is at high-impedance (Hi-Z), and the driving unit 160a outputs an indefinite signal (no signal) in an output high-impedance state, as the driving signal SD. In this case, when the second pulse P2 is induced while the control terminal of the switching element 180 is biased by the biasing unit 170a, the switching element 180 is turned on, as will be described later. In contrast, in a case where the ignition coil 800 is de-energized, the driving unit 160a outputs to the control terminal of the switching element 180, the potential of the terminal TIGN as the driving signal SD, and turns off the switching element 180.

The biasing unit 170a is configured to bias the control terminal of the switching element 180 so that the switching element 180 is turned on when the second pulse P2 that is a negative pulse of the pulse signal P is induced. In the present embodiment, the biasing unit 170a includes a resister element connected between a collector and a base of a later-described transistor constituting the switching element 180. A resistance value of the resister element constituting the biasing unit 170a is set so as to not to inhibit the driving of the control terminal of the switching element 180 by the driving unit 160a when the control terminal are biased so as to maintain the on-state of the switching element 180 until the switching element 180 is controlled to be turned off under the control of the control unit 150a, and when the switching element 180 is turned off under the control of the unit 150a.

The switching element 180 is configured to energize the primary winding 801 of the ignition coil 800. In the present embodiment, the switching element 180 includes an npn-type transistor. An emitter of the npn-type transistor constituting the switching element 180 is connected to one end (positive terminal) of the primary winding 801 of the ignition coil 800 via the terminal TIGN. A collector of the npn-type transistor is connected to the other end (negative terminal) of the primary winding 801 of the ignition coil 800 via the terminal TE. A base of the npn-type transistor is connected to an output unit of the driving unit 160a. In the present embodiment, the terminal TE, as well as the core 803 and the other ends of the respective primary and secondary windings 801 and 802 of the ignition coil 800, are grounded. Accordingly, the collector of the npn-type transistor constituting the switching element 180 is grounded.

Here, when the switching element 180 is turned on while the second pulse P2 that is a negative pulse is induced, energization of the primary winding 801 of the ignition coil 800 is initiated. When the switching element 180 is turned off, the energization of the ignition coil 800 is terminated. In other words, the energization of the ignition coil 800 is controlled in accordance with the on and off of the switching element 180. The transistor constituting the switching element 180 is preferably a multi-stage Darlington transistor. This is because not only the current amplification factor is large, but also apparent Vbe increases, thereby making it easy to detect a biased state when the switching element 180 is turned on, from the voltage between the base and emitter of the transistor. Here, the configuration is not limited to this example, and any device may be used as the switching element 180 as long as a biased state can be detected.

Figure 3:
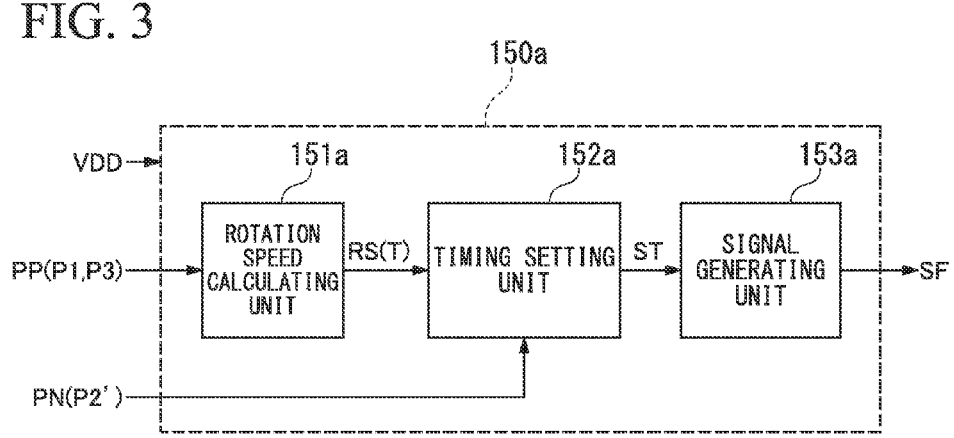
FIG. 3 is a functional block diagram showing an example of a configuration of a control unit included in the ignition device according to the first embodiment of the present invention.

FIG. 3 is a functional block diagram showing an example of a configuration of the control unit 150a included in the ignition control device 100A. The control unit 150a includes a rotation speed calculating unit 151a, a timing setting unit 152a, and a signal generating unit 153a. The rotation speed calculating unit 151a is configured to calculate the rotation speed RS of the internal combustion engine, using the positive pulse signal PP generated by the positive pulse signal generating unit 120a. A signal indicating the rotation speed RS is supplied to a timing setting unit 152a. In the present embodiment, the rotation speed RS is calculated from a period T of the first pulse P1 of the positive pulse signal PP, among the pulses included in the pulse signal P. Generally, the rotation speed of the internal combustion engine is represented by revolutions per minute. However, since the rotation speed RS of the internal combustion engine one-to-one corresponds to the period T of the first pulse P1, the period T of the first pulse Pb may be treated as the rotation speed RS of the internal combustion engine.

Here, it is assumed in the present embodiment that the rotation speed RS is calculated from the period T of the first pulse P1, but the configuration is not limited to this example. The rotation speed RS may be calculated using any pulse included in the pulse signal P as long as the rotation speed RS can be reflected at the de-energization timing of the ignition coil 800. For example, the rotation speed RS may be calculated from a period of the second pulse P2. Alternatively, the rotation speed RS may be calculated from: a time interval between a leading or trailing edge of any one of the first pulses P1 to P3 in the previous rotation period and a leading or trailing edge of the first pulse P1 in the current rotation period; a time interval between a leading or trailing edge of any one of the first pulses P1 to P3 in the previous rotation period and a leading edge of the second pulse P2 in the current rotation period; or a time interval between a leading or trailing edge of the first pulse P1 in the previous rotation period and a leading edge of the second pulse P2 in the current rotation period.

The timing setting unit 152a is configured to, based on the rotation speed RS calculated by the rotation speed calculating unit 151a, set a timing for controlling the de-energization of the primary winding 801 of the ignition coil 800 in response to the pulse signal P. In the present embodiment, the timing setting unit 152a sets a de-energization timing of the ignition coil 800 in response to the second pulse P2 following the head first pulse P1 included in the pulse signal P in each rotation cycle of the internal combustion engine. The de-energization timing is set so as to obtain a desired ignition timing with reference to a value of the rotation speed RS. For example, the de-energization timing is set using the timer function of the microcomputer. The timing setting unit 152a generates a de-energization timing signal ST indicating the set de-energization timing. This de-energization timing signal ST is supplied to the signal generating unit 153a.

The signal generating unit 153a is configured to generate an ignition control signal SF for controlling the switching element 180, using the timing set by the timing setting unit 152a. In the present embodiment, the signal generating unit 153a generates, as the ignition control signal SF, a signal that transitions from the high level signal to a low level signal at the de-energization timing indicated by the energization timing signal ST received from the timing setting unit 152a. In other words, the signal generating unit 153a generates the ignition control signal SF so as to turn off the switching element 180 at the timing defined by the de-energization timing signal ST, thus terminating the energization of the ignition coil 800.

Here, the configuration is not limited to the above-described example, and the signal format of the ignition control signal SF is optional as long as a de-energization timing of the ignition coil 800 can be specified. Additionally, any combination of the rotation speed calculating unit 151a, the timing setting unit 152a, and the signal generating unit 153a may be integrated into one functional block.

[Description of Operation]

Figure 4:
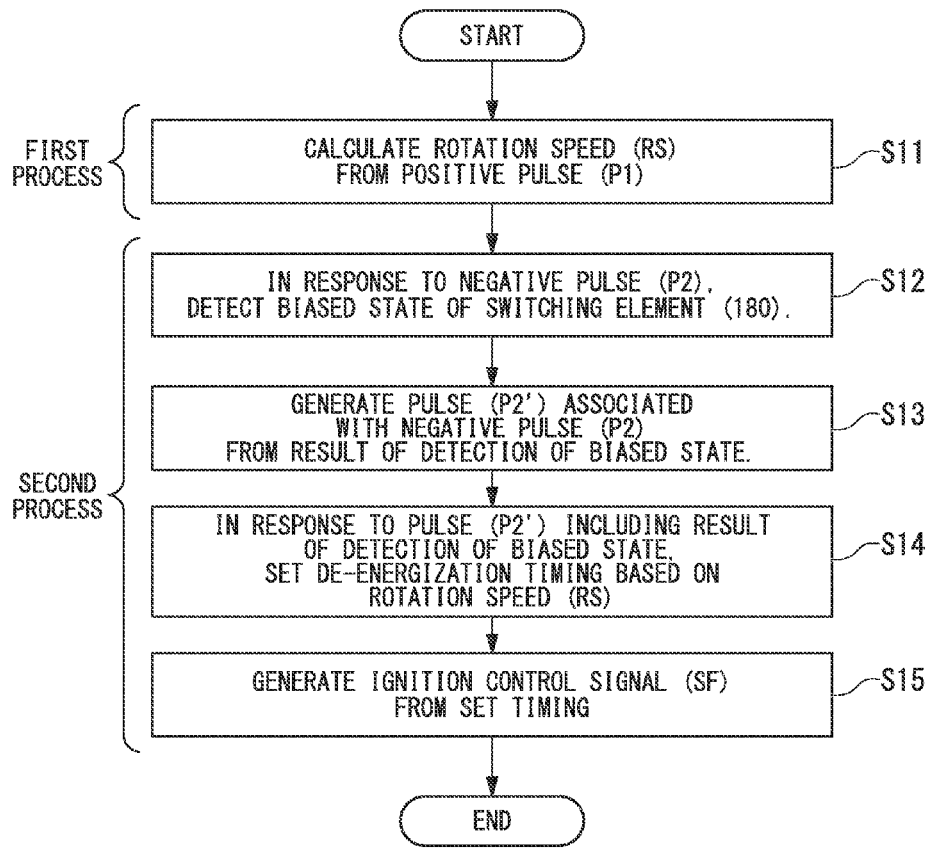
FIG. 4 is a flowchart showing a flow of operation of the ignition control device according to the first embodiment of the present invention.

Next, operation of the ignition control device 100A will be described along a flow shown in FIG. 4, with reference to a timing chart shown in FIG. 5. Here, FIG. 4 is a flowchart showing a flow of operation of the ignition control device 100. FIG. 5 is a timing chart illustrating the operation of the ignition control device 100A.

Here, in the present embodiment, the operation related to ignition control is performed in response to the first pulse P1 and the second pulse P2 (pulse P2'). Hereinafter, a process related to operation to be performed in response to the first pulse P1 is referred to as a first process, and a process related to operation to be performed in response to the second pulse P2 (pulse P2') is referred to as a second process.

When the internal combustion engine is initiated to rotate, as illustrated in FIG. 5, a pulse train of the first pulse P1—the second pulse P2—the third pulse P3 is induced as a pulse signal P in the primary winding 801 of the ignition coil 800. The power generating unit 110a generates the power supply voltage VDD using the first and third pulses P1 and P3 that are positive pulses, among the pulses included in the pulse signal P induced in the primary winding 801 of the ignition coil 800. Then, the power generating unit 110a supplies the generated power supply voltage VDD to the control unit 150a.

When the current rotation cycle is initiated at time t2, and the first pulse P1 that is a positive pulse is induced, the positive pulse signal generating unit 120a detects the first pulse P1 from the pulse signal P. Then, the positive pulse signal generating unit 120a generates a positive pulse signal PP including the first pulse P1 and outputs the generated positive pulse signal PP to the control unit 150a.

The control unit 150a operates using the power supply voltage VDD supplied from the power generating unit 110a, and performs the first process for calculating the rotation speed RS of the internal combustion engine in response to the first pulse P1 included in the positive pulse signal PP received from the primary pulse signal generating unit 120a (step S11). Specifically, at the time t2 at which the current rotation period starts, the rotation speed calculating unit 151a constituting the control unit 150a detects, in response to the first pulse P1, a time interval from a leading edge (rising edge) of the first pulse P1 in the previous rotational period to a leading edge (rising edge) of the first pulse P1 in the current rotation period, that is, the period T of the first pulse P1. Then, the rotation speed calculating unit 151a calculates the rotation speed RS of the internal combustion engine from the period T of the first pulse P1. The rotation speed calculating unit 151a generates a signal indicating the calculated rotation speed RS and outputs the generated signal to the timing setting unit 152a.

Next, when the second pulse P2 that is a negative pulse is induced at time t3, as described next, the control unit 150a performs, in response to the second pulse P2 (pulse P2'), the second process for generating an ignition control signal SF based on the rotation speed RS (S12 to S15).

Here, in the state before the time t3 at which the second pulse P2 is induced, the control unit 150a outputs the ignition control signal SF at the high level so that an output of the driving unit 160a becomes at high impedance. In the present embodiment, the control unit 150a initializes the ignition control signal SF to a high-level signal in response to the third pulse P3 in the previous rotation period, and makes the output of the driving unit 160a in a high-impedance state. Additionally, before the time t3 in the current rotation period, the potential of the terminal TIGN to be connected with the emitter of the npn-type transistor constituting the switching element 180 never becomes lower than the potential of the terminal TE to be connected with the collector thereof. Further, the base of the npn-type transistor constituting the switching element 180 is biased at the potential of the terminal TE (ground potential) by the biasing unit 170a. Accordingly, the switching element 180 is turned off before the time t3.

Figure 6:
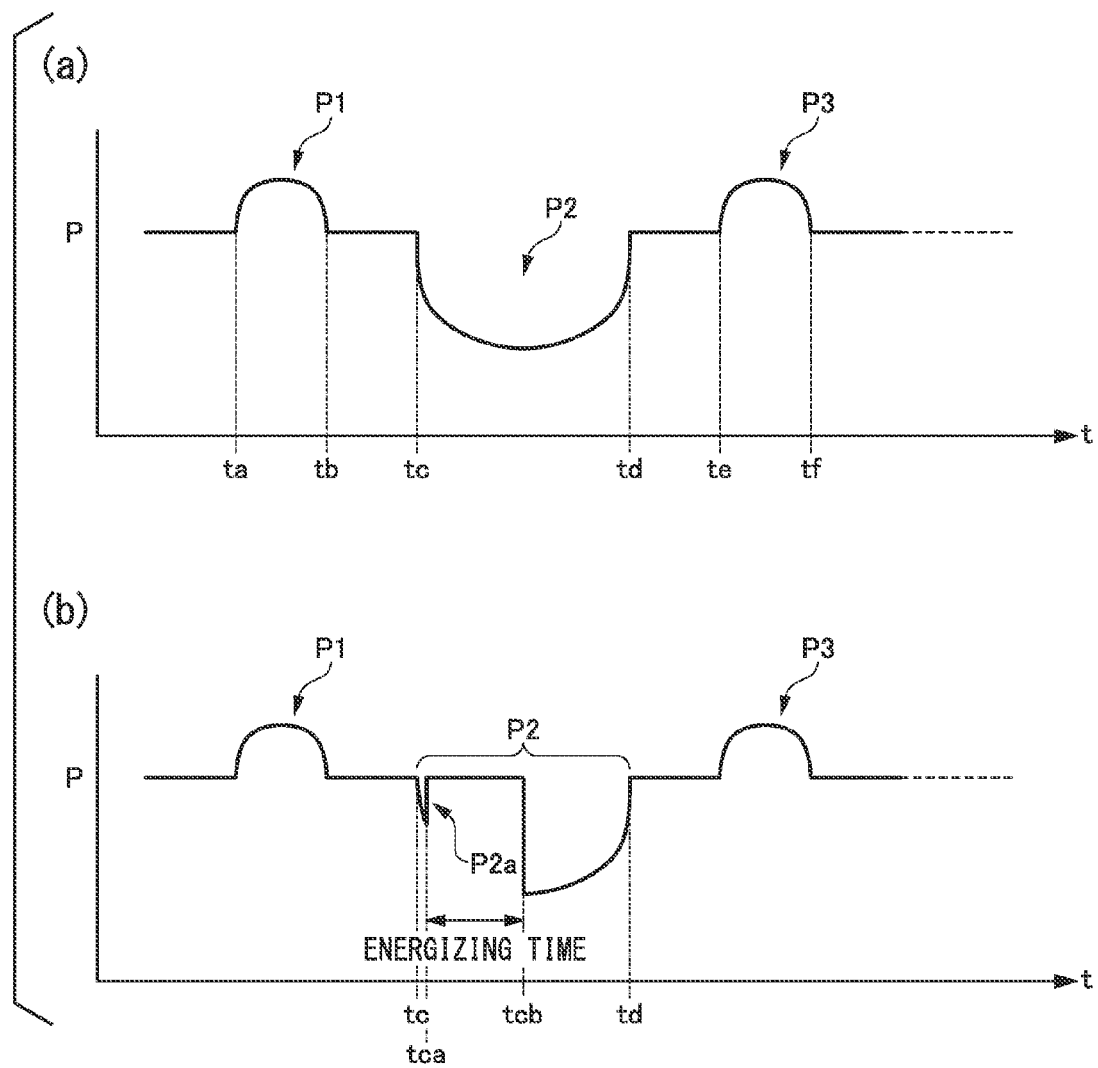
FIG. 6 is a waveform diagram illustrating an example of a pulse signal to be induced in the ignition coil, where

When the second pulse P2 that is a negative pulse is induced in the primary winding 801 of the ignition coil 800 at time t3 from the above state, the second pulse P2 is applied via the terminal TIGN to the emitter of the npn transistor constituting the switching element 180. At this time, the base of the npn-type transistor constituting the switching element 180 is biased by the biasing unit 170a to the ground potential that is the same as that of the collector. For this reason, when the second pulse P2 that is a negative pulse is induced, the emitter potential of the npn-type transistor constituting the switching element 180 is reduced. Consequently, the voltage between the base and the emitter of the npn-type transistor exceeds Vbe (threshold voltage at which the transistor is turned on), and the npn-type transistor constituting the switching element 180 is immediately turned on. When the npn-type transistor constituting the switching element 180 is turned on, the terminals of the primary winding 801 of the ignition coil 800 are short-circuited via the switch element 180. Thus, even if the second pulse P2 is induced, a change of the voltage between the terminals of the primary winding 801 of the ignition coil 800 is suppressed, and the negative pulse P2a as shown in the above-described FIG. 6(b) is not generated. Accordingly, erroneous ignition is prevented when the second pulse P2 is induced.

Additionally, when the npn-type transistor constituting the switching element 180 is turned on at the time t3, a current IF generated by the second pulse P2 flows in a closed loop formed by the switching element 180 and the primary winding 801 of the ignition coil 800. Thereby, energization of the ignition coil 800 is initiated, thus storing energy in the primary winding 801.

Further, when the switching element 180 is turned on at time t3, the state detecting unit 130 detects a biased state of the npn-type transistor constituting the switching element 180 and outputs a detection signal SJ to the negative pulse signal generating unit 140 (step S12). The detection signal SJ indicates that the second pulse P2 is induced, thereby biasing the switching element 180 into the on-state. In the present embodiment, from the collector current of the dummy transistors 131 that simulates the switching device 180, the state detecting unit 130 detects the state where the switching element 180 is biased into the on-state, and supplies to the negative pulse signal generating unit 140a, the collector current of the dummy transistor 131 as the detection signal SJ.

The negative pulse signal generating unit 140a generates a negative pulse signal PN including a pulse P2' corresponding to the second pulse P2, based on the detection signal SJ supplied from the state detecting unit 130 (step S13). Then, the negative pulse signal generating unit 140a outputs the generated negative pulse signal PN to the control unit 150a. Specifically, the negative pulse signal generating unit 140a detects the collector current of the dummy transistor 131 received as the detection signal SJ from the state detecting unit 130, thus generating the negative pulse signal PN that is a voltage signal. Immediately after the time t3, the negative pulse signal PN transitions from the high-level signal to a low-level signal in response to the second pulse P2.

Here, as described above, when the second pulse P2 that is a negative pulse is induced in the primary winding 801 of the ignition coil 800 at the time t3, the biasing unit 170a controls the npn-type transistor constituting the switching element 180 to be turned on immediately, thereby fixing the voltage between the terminal TIGN and the terminal TE to zero V. For this reason, it is difficult to detect the second pulse P2 as a voltage signal. Therefore, in the present embodiment, when the second pulse P2 is induced, the collector current of the npn-type transistor constituting the switching element 180 is reflected onto the collector current of the dummy transistor 131 of the state detecting unit 130, thereby making it possible to detect the second pulse P2 from the collector current of the dummy transistor 131.

In response to the pulse P2' included in the negative pulse signal PN received from the negative pulse signal generating unit 140a, the timing setting unit 152a included in the control unit 150a sets a de-energization timing of the ignition coil 800 based on the rotation speed RS calculated by the rotation speed calculating unit 151a in the above-described first process (step S14). Then, the timing setting unit 152a generates a de-energization timing signal ST indicating the above set de-energization timing, and outputs the generated de-energization timing signal ST to the signal generating unit 153a. In the present embodiment, the timing setting unit 152a generates as the de-energization timing signal ST, a signal that transitions from the low-level signal to a high-level signal at time t4.

The de-energization timing indicated by the de-energization timing signal ST is a desired timing preset as an ignition timing in accordance with the rotation speed RS of the internal combustion engine. For example, data indicating the de-energization timing is stored in the timing setting unit 152a in tabular form, in associated with the rotation speed RS. The timing setting unit 152a refers to the above table based on the rotation speed RS, thus obtaining the de-energization timing. However, the configuration is not limited to this example. Any other technique may be used to obtain a de-energization timing. For example, a energization timing may be calculated from the rotation speed RS, using a mathematical expression representing a correspondence relationship between the rotation speed RS and the de-energization timing, which is defined in the above table.

In the present embodiment, the de-energization timing is set so that, for example, as the rotation speed RS is higher, a time interval from the time t3 corresponding to the leading edge (falling edge) of the second pulse P2 shown in FIG. 5 to the time t4 corresponding to the ignition timing is shorter, in accordance with the advanced amount of the time at which the piston of the internal combustion engine reaches the top dead center. Conversely, the de-energization timing is set so that as the rotation speed RS is lower, the time interval from the time t3 corresponding to the leading edge (falling edge) of the second pulse P2 shown in FIG. 5 to the time t4 is longer, in accordance with the delayed amount of the time at which the piston of the internal combustion engine reaches the top dead center. In other words, the de-energization timing is controlled so that the rotational angle corresponding to the ignition timing becomes substantially constant. Thus, it is possible to stabilize the ignition timing in accordance with the rotation speed RS, even if the rotation speed RS is varied.

For example, using the timer function of the microcomputer, the de-energization timing obtained from the above table is set as a timer value. In other words, in response to the leading edge of the second pulse P2, the timing setting unit 152a sets to the timer, a timer value indicating the de-energization timing in accordance with the rotation speed RS. Then, with reference to the timer, the timing setting unit 152a has the signal level of the de-energization timing signal ST2 transition from the low-level signal to a high-level signal. Generally, a microcomputer operates in synchronization with a fixed system clock, and even if the system clock is varied by, for example, a change in ambient temperature, a variation of the timer remains in the variation range of the system clock. For this reason, it is possible to suppress a variation in the de-energization timing even if ambient temperature changes, thus making it possible to stabilize the ignition timing.

Here, the configuration is not limited to the example described above, the correspondence relationship between the de-energization timing and the rotation speed RS may be set optionally. For example, the de-energization timing may be switched in two steps while regarding a predetermined rotation speed as a threshold. Alternatively, the configuration may be such that until the rotation speed RS reaches the predetermined rotation speed, the de-energization timing may be changed in accordance with the rotation speed RS calculated by the rotation speed calculating unit 151a, and after the rotation speed RS reaches the predetermined rotation speed, the de-energization timing may be fixed to a constant value. Conversely, the configuration may be such that until the rotation speed RS reaches the predetermined rotation speed, the de-energization timing may be fixed to a constant value, and after the rotation speed RS reaches the predetermined rotation speed, the de-energization timing may be changed in accordance with the rotation speed RS. Additionally, for a use requiring no stability of ignition control with respect to a change in rotation speed RS, the de-energization timing may be fixed, irrespective of the rotation speed RS.

Subsequently, using the timing indicated by the de-energization timing signal ST, the signal generating unit 153a constituting the control unit 150a generates an ignition control signal SF that transitions from the high-level signal to the low-level signal at the time t4 corresponding to the ignition timing. Then, the signal generating unit 153a outputs the generated ignition control signal SF (step S15). When the ignition control signal SF becomes at the low-level at the time t4, the driving unit 160a that receives this signal outputs the potential VIGN of the terminal TIGN, as a driving signal SD. Thus, the base voltage of the npn-type transistor constituting the switching element 180 becomes equal to the emitter voltage, thereby turning off the switching element 180 at the time t4.

When the switching element 180 is turned off at the time t4, the current IF flowing through the primary winding 801 of the ignition coil 800 is blocked, thereby de-energizing the ignition coil 800. At this time, due to the inductance of the primary winding 801, a high voltage (for example, 200V) proportional to a change in current IF flowing through the primary winding 801 is generated between the terminals of the primary winding 801. The high voltage generated in the primary winding 801 induces in the secondary winding 802, an additional high voltage (voltage at which the spark plug 900 is dischargeable) in accordance with the turn ratio between the primary winding 801 and the secondary winding 802. The high voltage of the secondary winding 802 is applied to the spark plug 900, thus causing the spark plug 900 to discharge. If the spark plug 900 is discharged, the fuel mixture in the cylinder of the internal combustion engine is ignited by the discharge.

Thereafter, when the third pulse P3 is induced at time t6, the control unit 150a initializes the de-energization timing signal ST to a low-level signal, and initializes the ignition control signal SF to a high-level signal, thus preparing for operation in the next rotation period. Thus, the signal generating unit 153a constituting the control section 150a outputs, as the ignition control signal SF, a signal that maintains at the low level during the time interval from the time t4 to time t6. In the present embodiment, the low-level period of the ignition control signal SF corresponds to the period for which the ignition coil 800 is de-energized. However, the configuration is not limited to this example. A signal format of the ignition control signal SF is optional as long as a period for which the ignition coil 800 is de-energized can be specified.

Here, when the switching element 180 is biased into the off-state at the time t4, the state detecting unit 130 outputs as a detection signal SJ, a signal indicating that the switching element 180 is not in the state of being biased into the on-state. The negative pulse signal generating unit 140a receiving this detection signal SJ outputs a high-level signal as a negative pulse signal PN at the time t4. For this reason, the pulse width of the pulse P2' included in the negative pulse PN signal becomes smaller than the pulse width of the second pulse P2, and thus pulse widths do not match. However, such behavior of the negative pulse signal PN is not the essence of the present invention. In the present embodiment, the negative pulse signal PN is used to determine the timing of the leading edge of the second pulse P2. Therefore, a signal format of the negative pulse PN signal is optional as long as a timing of the leading edge of the second pulse P2 is recognizable.

Although the present invention has been expressed as the ignition control device 100A in the above-described first embodiment, the present invention can also be expressed as an ignition control method. In this case, the ignition control method according to the present invention can be expressed as, for example, an ignition control method of generating in an ignition coil, a voltage to be supplied to an ignition plug included in an internal combustion engine, based on a pulse signal to be induced in the ignition coil in accordance with a rotation of the internal combustion engine. The ignition control method includes: a step of when the pulse signal is generated, biasing a control terminal of a switching element configured to energize the ignition coil so as to turn on the ignition coil; a step of detecting the biased state of the switching element; and a step of setting a timing for controlling de-energization of the ignition coil in response to a result of the detection, and controlling the switching element to be turned off in accordance with the timing.

According to the above-described first embodiment, it is possible to suppress the influence of the ambient temperature and to suppress a variation in the de-energization timing of the ignition coil 800. Additionally, it is possible to adjust the de-energization timing so as to obtain a desired ignition timing in response to a change in the rotation speed RS, even if the rotation speed RS of the internal combustion engine is changed. Thus, it is possible to stabilize the ignition timing.

Further, according to the first embodiment, the de-energization timing is set in response to the leading edge of the second pulse P2 closest to the ignition timing among the first pulse P1, the second pulse P2, and the third pulse P3. For this reason, it is possible to accurately control the de-energization, thereby improving the accuracy of the ignition timing.

Here, it has been assumed in the above-described first embodiment that the rotation speed RS is calculated in the first process to be performed in response to the leading edge of the first pulse P1, but the configuration is not limited to this example. The rotation speed RS may be calculated in response to the trailing edge of the first pulse. Alternatively, the rotation speed RS may be calculated in the second process to be performed in response to the second pulse P2.

Additionally, it has been assumed in the above-described first embodiment that the de-energization timing is set in response to the leading edge of the second pulse P2, but the configuration is not limited to this example. The de-energization timing can be set in the first process to be performed in response to the first pulse P1.

Second Embodiment

In the above-described first embodiment, it is assumed that a biased state of the switching element 180 is detected from the bias voltage of the npn-type transistor constituting the switching element 180, using the dummy transistor 131 of the state detecting unit 130. In the second embodiment of the present invention, it is detected from the direction of the current flowing through the primary winding 801 of the ignition coil 800 that the switching element 800 is biased into the on-state. For this purpose, the state detecting unit 130 includes, for example, a shunt resistor (not shown) inserted in the current path of the primary winding 801. Then, the state detecting unit 130 of the present embodiment determines a direction of the current flowing through the primary winding 801 from the terminal voltage of the shunt resistor, thereby detecting a biased state of the switching element 180 based on a result of the determination.

As described above, the biased state in which the switching element 180 is turned on corresponds to a state in which a negative pulse is induced in the primary winding 801. Therefore, it is possible to detect the biased state of the switching element 180 from the direction of the current in the primary winding 801 when a negative pulse is induced. Except for the difference in the configuration of the state detecting unit 130 as described above, the ignition control device of the present embodiment is similar to that of the first embodiment.

Although the first and second embodiments of the present invention have been described above, the present invention is not limited to the above-described first and second embodiments, and variations, changes, modifications, substitutions, and the like can be made in various ways without departing from the scope of the present invention.

For example, it has been assumed in the above-described first and second embodiments that the rotation speed RS of the internal combustion engine is calculated from the period T of the first pulse P1, and the de-energization timing is set in response to the rotation speed RS. However, the configuration is not limited to this example. For example, the de-energization timing may be set with reference to the voltage of the pulse signal P. In this case, for example, focusing on the fact that the peak value of the amplitude of the pulse signal P tends to change in accordance with the rotation speed RS, the de-energization timing may be set with reference to the peak value of the amplitude of the first pulse P1.

Additionally, it has been assumed in the above-described first and second embodiments that the de-energization timing is set using the timer function of the microcomputer. However, the configuration is not limited to this example, and the de-energization timing may be set using any technique as long as the timing can be adjusted in accordance with the rotation speed RS. As an example of such a technique, there is a technique using a digital integrated circuit that sets, by logical operation, a de-energization timing in synchronism with a clock signal with a constant period, which has low dependency on the ambient temperature.

Hereinafter, a third embodiment of the present invention will be described with reference to the drawings. The same reference numerals will be appended to the same configurations as those of the first embodiment, and description thereof is omitted.

Third Embodiment [Description of Configuration]

Figure 7:
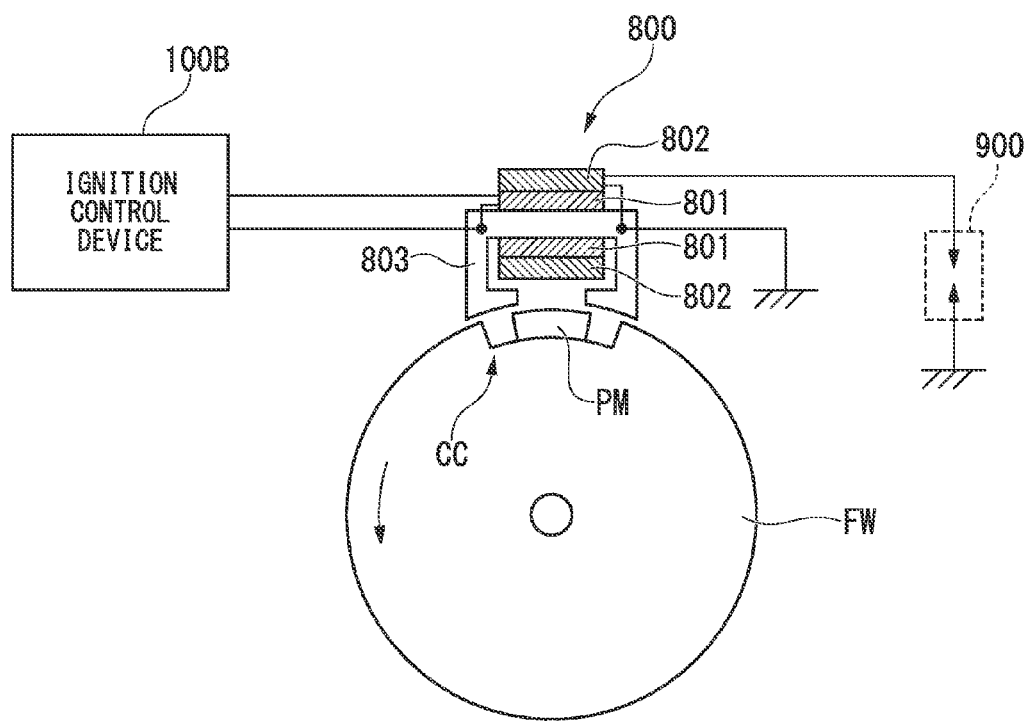
FIG. 7 is a diagram schematically showing an application example of an ignition control device according to a third embodiment of the present invention.

FIG. 7 is a diagram schematically showing an application example of an ignition control device 100B according to the third embodiment of the present invention. The ignition control unit 100B is connected to the primary winding 801 of the ignition coil 800 mounted on the internal combustion engine (not shown). The spark plug 900 is connected to the secondary winding 802 of the ignition coil 800. Both ends of the core 803 of the ignition coil 800 are disposed in proximity to the outer peripheral portion of the flywheel FW provided in the internal combustion engine. The core 803 and the flywheel FW form a closed magnetic circuit.

The recess CC is formed on the outer peripheral portion of the flywheel FW. Additionally, the permanent magnet PM is mounted on the recessed portion CC. If the flywheel FW equipped with the permanent magnet PM is rotated, a change in magnetic flux in the core 803 of the ignition coil 800 causes, in each rotation cycle of the internal combustion engine, the first to third pulses P1 to P3 to be sequentially induced in the primary winding 801 of the ignition coil 800, as the pulse signal P as shown in later-described FIG. 15. The first pulse P1 is a positive pulse. The second pulse P2 is a negative pulse. The third pulse P3 is a positive pulse.

In the present embodiment, the ignition timing of the internal combustion engine (discharge initiation timing of the spark plug 900) is set to be, for example, a timing specified by a predetermined rotation angle measured from the leading edge of the second pulse P2 that is a negative pulse (timing at which the piston of the internal combustion engine is located at the top dead center). Additionally, the de-energization timing of the ignition coil 800 corresponds to the ignition timing. However, the timing is not limited to this example, and the ignition timing may be optionally defined.

Here, in the present embodiment, the pulse signal P is intended to include, in each rotation cycle, a pulse train including the first pulse P1, the second pulse P2, and the third pulse P3, but is not limited to this example. Pulses included in the pulse signal P may be optional as long as initiation and termination timings of energization of the ignition coil 800 can be controlled.

Figure 8:
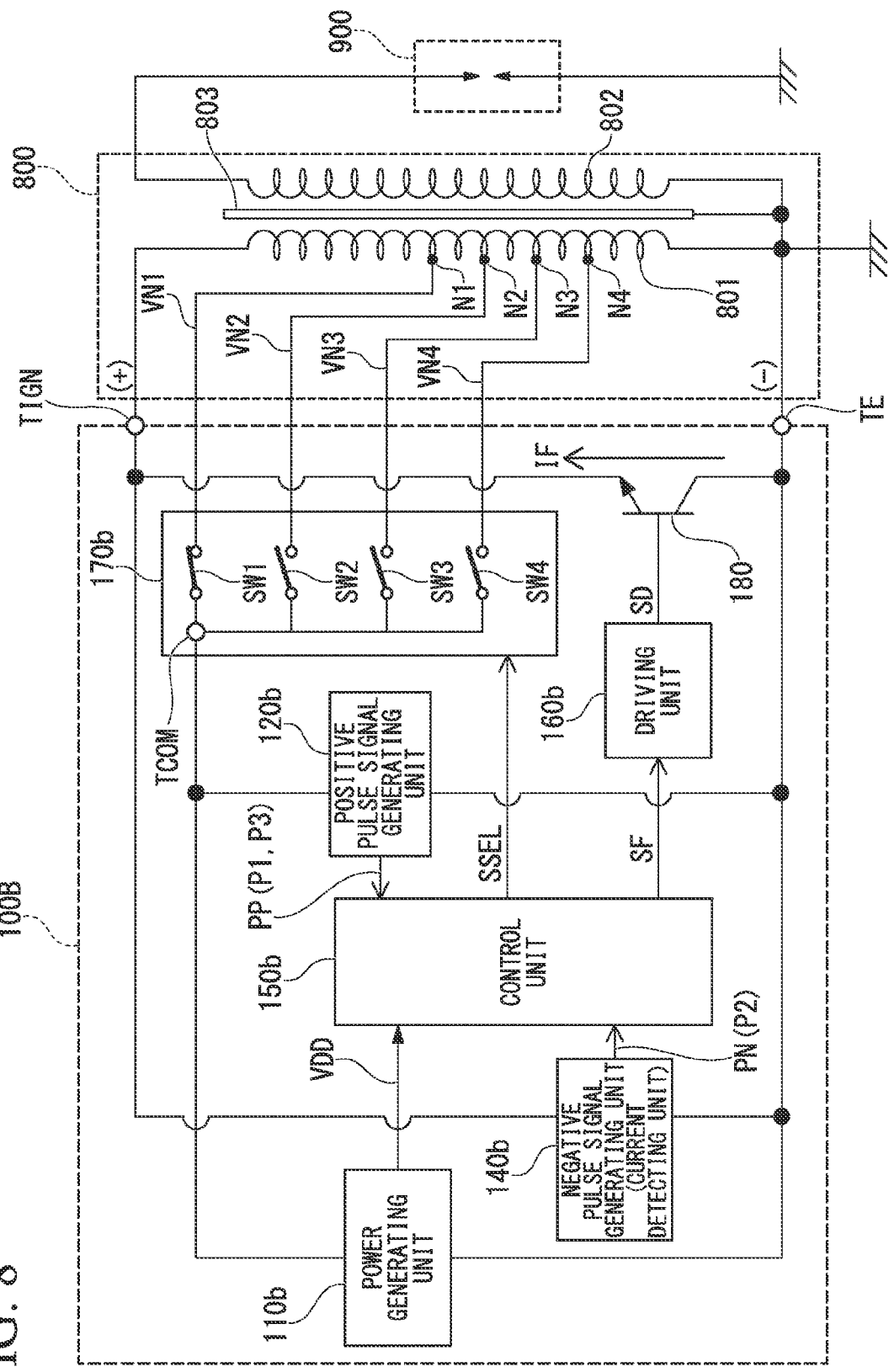
FIG. 8 is a functional block diagram showing an example of a configuration of the ignition control device according to the third embodiment of the present invention.

FIG. 8 is a functional block diagram showing an example of a configuration of the ignition control device 100B according to the present embodiment. The ignition control device 100B is configured to, based on the pulse signal P induced in the primary winding 801 of the ignition coil 800 in accordance with the rotation of the internal combustion engine, cause the voltage to be supplied to the ignition plug 900 provided in the internal combustion engine, to be generated in the ignition coil 800. The ignition control unit 100B includes a power generating unit 110b, a positive pulse signal generating unit 120b, a negative pulse signal generating unit 140b, a control unit 150b, a driving unit 160b, a switching element 180, and a selecting unit 170b.

The power generating unit 110b is configured to generate, as an operating power supply for the ignition control unit 100B, a power supply voltage VDD from the first and the third pulses P1 and P3 which are positive pulses of the pulse signal P induced in the primary winding 801 of the ignition coil 800. The intermediate nodes N1 to N4 set to the primary winding 801 of the ignition coil 800 via the selecting unit 170b are connected to an input unit of the power generating unit 110b. The power generating unit 110b generates the power supply voltage VDD from any one of voltages VN1 to VN4 of the pulses of the intermediate nodes N1 to N4, which is selected by the selecting unit 170b.

Figure 15:
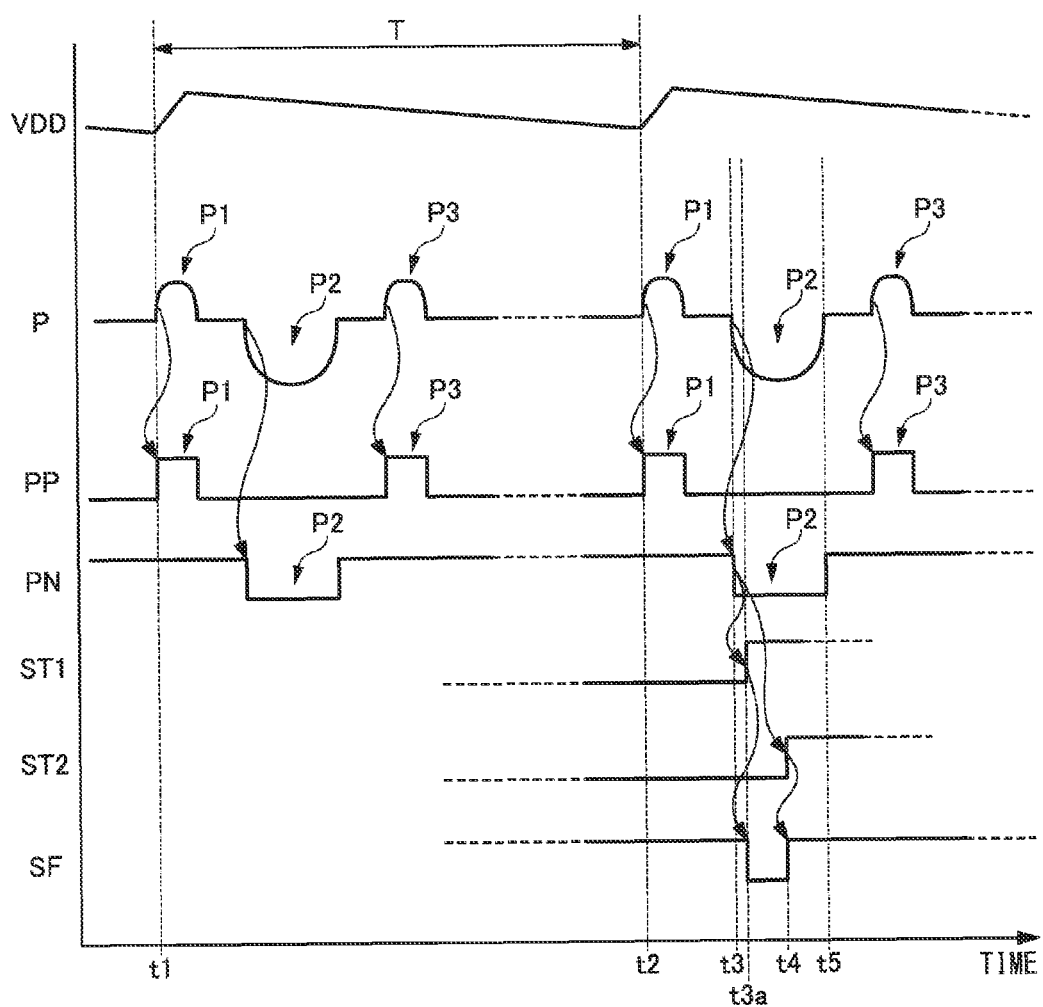
FIG. 15 is a timing chart supplementarily illustrating the operation (ignition operation) of the ignition control device according to the third embodiment of the present invention.

In the present embodiment, the voltages VN1 to VN4 of the pulses of the intermediate nodes N1 to N4 are the voltages of the intermediate nodes N1 to N4 at the time when the first pulse P1 or the third pulse P3 that is a positive pulse is induced in the primary winding 801. For this reason, as illustrated in FIG. 15 as will be described later, if the first pulse P1 and the third pulse P3 are lost, the power supply voltage VDD is decreased over time. However, the power supply voltage VDD is a voltage sufficient for the control unit 150b to perform required control operation in each rotation cycle.

Here, depending on the circuit types of the positive pulse signal generating unit 120b, the negative pulse signal generating unit 140b, the driving unit 160b, and the selecting unit 170b, the power supply voltage VDD may be supplied thereto. Additionally, in the present embodiment, it is assumed that the intermediate nodes N1 to N4 are set to the primary winding 801 of the ignition coil 800, but the number of intermediate nodes is optional.

The positive pulse signal generating unit 120b is configured to detect a positive pulse from the pulse signal P induced in the primary winding 801 of the ignition coil 800, thereby generating a positive pulse signal PP. The positive terminal (+) and the negative terminal (−) of the primary winding 801 of the ignition coil 800 are connected to the positive pulse signal generating unit 120b via the terminal TIGN and the terminal TE. In the present embodiment, the negative terminal (−) of the primary winding 801 of the ignition coil 800 is grounded (hereinafter, the negative terminal of the primary winding 801 is appropriately referred to as a "reference terminal"). The positive pulse signal generating unit 120b detects a positive pulse when the potential of the terminal TIGN becomes high compared to the potential of the terminal TE, thereby generating a positive pulse signal PP. The positive pulse signal PP includes the first pulse P1 and the third pulse P3 which are positive pulses, and is supplied to the control unit 150b. In the present embodiment, the positive pulse signal PP is used as a signal indicating the leading edges of the respective first and third pulses P1 and P3.

The negative pulse signal generating unit 140b is configured to detect a negative pulse from the pulse signal P induced in the primary winding 801 of the ignition coil 800, thereby generating a negative pulse signal PN. The positive terminal (+) and the negative terminal (−) of the primary winding 801 of the ignition coil 800 are connected to the negative pulse signal generating unit 140b via the terminal TIGN and the terminal TE. The negative pulse signal generating unit 140b detects a negative pulse when the potential of the terminal TIGN becomes low compared to the potential of the terminal TE, thereby generating a negative pulse signal PN. The negative pulse signal PN includes a second pulse P2 that is a negative pulse, and is supplied to the control unit 150b. In the present embodiment, the negative pulse signal PN is used as a signal indicating the leading edge of the second pulse P2.

The control unit 150b is configured to operate using the power supply voltage VDD to be supplied from the power generating unit 110b, and perform a control related to selection operation by the selecting unit 170b, and a control related to ignition operation by the switching element 180. In other words, the control unit 150b performs, as the control related to the selection operation, a process of generating a selection signal SSEL for having the selecting unit 170b select one of the plurality of intermediate nodes N1 to N4 set to the primary winding 801 of the ignition coil 800, in accordance with the rotation speed RS of the internal combustion engine.

Additionally, the control unit 150b performs, as the control related to the ignition operation, a process of generating an ignition control signal SF for controlling energization of the ignition coil 800, with reference to pulses included in the pulse signal P induced in the primary winding 801 of the ignition coil 800 in accordance with the rotation of the internal combustion engine. In the present embodiment, the control unit 150b is implemented by, for example, a microcomputer configured to operate in accordance with a control program describing processing procedure related to the ignition operation, or a dedicated digital control IC (integrated circuit) having a logical operation function equivalent to that of the processing procedure described by the control program. The detailed configuration of the control unit 150b will be described later.

The driving unit 160b is configured to drive the switching element 180 based on the ignition control signal SF to be received from the control unit 150b. The driving unit 160b outputs to a control terminal of the switching element 180, a driving signal SD for driving the switching element 180, in accordance with the signal level of the ignition control signal SF.

The switching element 180 is configured to be driven by the driving signal SD received from the driving unit 160b and to energize the primary winding 801 of the ignition coil 800. In the present embodiment, the switching element 180 includes an npn-type transistor. An emitter of the npn-type transistor constituting the switching element 180 is connected to a positive terminal (+) of the primary winding 801 of the ignition coil 800 via the terminal TIGN. Additionally, a collector of the npn-type transistor is connected to a negative terminal (−) of the primary winding 801 of the ignition coil 800 via the terminal TE. Further, a base of the npn-type transistor is connected to the output unit of the driving unit 160b.

Here, if the switching element 180 is turned on based on the driving signal SD while the second pulse P2 that is a negative pulse is induced, energization of the primary winding 801 of the ignition coil 800 is initiated. If the switching element 180 is turned off, the energization of the primary winding 801 is terminated. In other words, the initiation and termination of the energization of the primary winding 801 of the ignition coil 800 is controlled in accordance with the on and off of the switching element 180 based on the driving signal SD. Here, the switching element 180 is not limited to the npn-type transistor, and any device may be used.

The selecting unit 170b is configured to alternatively select any one of the intermediate nodes N1 to N4 set to the primary winding 801 of the ignition coil 800, based on the selection signal SSEL to be received from the control unit 150b. For that purpose, the selecting unit 170b includes a plurality of switches SW1 to SW4. The input contact points of the switches SW1 to SW4 are connected respectively to the intermediate nodes N1 to N4 of the primary winding 801 of the ignition coil 800. Specifically, the input contact point of the switch SW1 is connected to the intermediate node N1. Additionally, input contact point of the switch SW2 is connected to the intermediate node N2. Further, the input contact point of the switch SW3 is connected to the intermediate node N3. Moreover, the input contact point of the switch SW4 is connected to the intermediate node N4. Additionally, output contact points of the plurality of switches SW1 to SW4 are connected to a common terminal TCOM. Further, an input unit of the power generating unit 110b is connected to the common terminal TCOM.

In the present embodiment, the number of turns n4 of the primary winding 801 between the intermediate node N4 and a reference terminal that is the negative terminal (−) of the primary winding 801 of the ignition coil 800 is smaller than the number of turns n3 between the intermediate node N3 and the reference terminal Additionally, the number of turns n3 is smaller than the number of turns n2 between the reference terminal and the intermediate node N2. Further, the number of turns n2 is smaller than the number of turns n1 between the reference terminal and the intermediate node N1. Therefore, in the present embodiment, respective ratios of the numbers of turns n1 to n4 to the total number of turns n of the primary winding 801 are smaller in order from the intermediate node N1 toward the intermediate node N4.

Here, the voltages VN1 to VN4 of the pulses generated respectively in the intermediate nodes N1 to N4 when a positive pulse is generated in the primary winding 801 in accordance with the rotation of the internal combustion engine are determined in accordance with the ratios of the number of turns n1 to n4 to the total number of turns n of the primary winding 801. In the present embodiment, the respective ratios of the number of turns n1 to n4 to the total number of turns n of the primary winding 801 becomes smaller in the order from the intermediate node N1 toward the intermediate node N4. For this reason, the voltages VN1, VN2, VN3, and VN4 have a size relationship such that VN1>VN2>VN3>VN4.

Additionally, in the present embodiment, among the switches SW1 to SW4 which constitute the selecting unit 170b, the switch SW1 connected to the intermediate node N1 in which the highest voltage VN1 among the voltages VN1 to VN4 is generated is a normally closed switch, and the other switches SW2 to SW4 are normally open switches. By using a normally closed switch as the switch SW1, the intermediate node N1 is selected by the selecting unit 170b in the initial state before the internal combustion is initiated to rotate, that is, in a state where a positive pulse is not induced in the primary winding 801. As a result, when a positive pulse is induced in the primary winding 801 of the ignition coil 800, the voltage VN1 of the pulse of the intermediate node N1 is supplied promptly to the power generating unit 110b, thereby generating the operating power supply voltage VDD.

Figure 9:
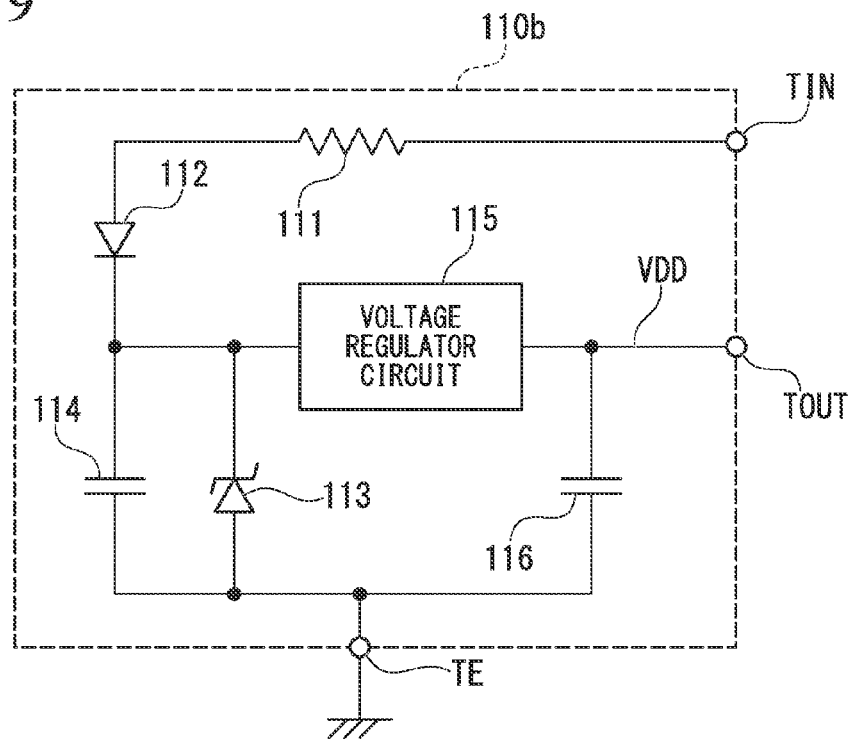
FIG. 9 is a circuit diagram showing an example of a configuration of a power generating unit included in the ignition control device according to the third embodiment of the present invention.

FIG. 9 is a circuit diagram showing an example of a configuration of the power generating unit 110b included in the ignition control device 100B. As shown in the figure, the power generating unit 110b includes a resister element 111, a diode 112, a zener diode 113, a capacitor 114, a voltage regulator circuit 115, and a capacitor 116. Here, one end of the resister element 111 is connected to an input terminal TIN forming an input unit of the power generating unit 110b. A common terminal TCOM of the selecting unit 170b shown in FIG. 8 is connected to the input terminal TIN. An anode of the diode D112 is connected to the other end of the resister element 111. One electrode of the capacitor 114 is connected to a cathode of the diode D112. The other electrode of the capacitor 114 is grounded via the terminal TE.

A cathode of the zener diode 113 is connected to the cathode of the diode 112. An anode of the zener diode 113 is grounded via the terminal TE. An input unit of the voltage regulator circuit 115 is connected to the cathode of the zener diode 113. An output unit of the voltage regulator circuit 115 is connected to an output terminal TOUT forming an output unit of the power generating unit 110b. The output terminal TOUT is connected to the power supply terminal of the control unit 150b shown in FIG. 8. Additionally, the output unit of the voltage regulator circuit 115 is connected to one electrode of the capacitor 116. The other electrode of capacitor 116 is via the terminal TE.

In the present embodiment, the resistor element 111, the diode 112, and the zener diode 113 constitute a clamping circuit for clamping to a predetermined voltage, the voltages VN1 to VN4 of the pulses of the intermediate nodes N1 to N4 selected by the selecting unit 170b. The voltage regulator circuit 115 is configured to lower the constant voltage obtained by the clamping circuit, thus obtaining a power supply voltage VDD. Additionally, the capacitors 114 and 116 are configured to stabilize the input voltage and the output voltage of the voltage regulator circuit 115.

Figure 10:
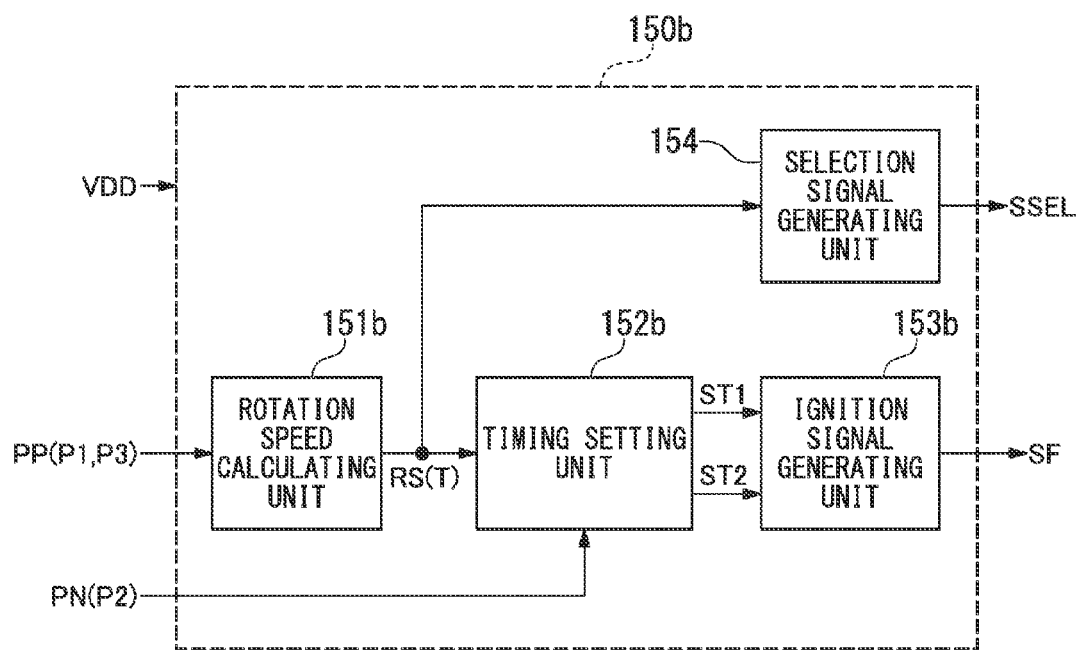
FIG. 10 is a functional block diagram illustrating an example of a configuration of a control unit included in the ignition control device according to the third embodiment of the present invention.

FIG. 10 is a functional block diagram showing an example of the configuration of the control unit 150b included in the ignition control device 100B. The control unit 150b includes a rotation speed calculating unit 151b, a timing setting unit 152b, an ignition signal generating unit 153b, and a selection signal generating unit 154. The rotation speed calculating unit 151b is configured to calculate the rotation speed RS of the internal combustion engine, using the positive pulse signal PP detected by the positive pulse signal generating unit 120b. In the present embodiment, the rotation speed RS is calculated from the period T of the first pulse P1 among the pulses included in the positive pulse signal PP. Generally, the rotation speed of the internal combustion engine is represented by revolutions per minute. However, the rotation speed RS of the internal combustion engine one-to-one corresponds to the period T of the first pulse P1. For this reason, the period T of the first pulse P1 may be treated as the rotation speed RS of the internal combustion engine.

The timing setting unit 152b is configured to, based on the rotation speed RS calculated by the rotation speed calculating unit 151b, set the timing for controlling energization of the primary winding 801 of the ignition coil 800 in response to the negative pulse signal PN detected by the negative pulse signal generating unit 140b. In the present embodiment, the timing setting unit 152b initiates, in response to the second pulse P2 included in the negative pulse signal PN, a process of setting the initiation and termination timings of the energization of the primary winding 801 of the ignition coil 800. Additionally based on the set timings, the timing setting unit 152b generates and outputs an energization timing signal ST1 indicating the initiation timing of the energization, and a de-energization timing signal ST2 indicating the termination timing of the energization.

In the present embodiment, the energization timing signal ST1 is generated immediately in response to the second pulse P2. For this reason, the initiation timing of the energization substantially matches the timing of the leading edge of the second pulse P2. Additionally, the de-energization timing signal ST2 is generated based on the rotation speed RS in response to the second pulse P2. In other words, the de-energization timing signal ST2 is similar to the energization timing signal ST1 in that the de-energization timing signal ST2 is generated in response to the second pulse P2. However, the de-energization timing is set so that a desired ignition timing in accordance with a value of the rotation speed RS can be obtained. Hereinafter, as appropriate, the energization timing signal ST1 and the de-energization timing signal ST2 are collectively referred to as a "timing signal ST".

The ignition signal generating unit 153b is configured to generate an ignition control signal SF for controlling the switching element 180, using the timing set by the timing setting unit 152b. In the present embodiment, the ignition signal generating unit 153b generates, as the ignition control signal SF, a signal that is at the low-level in a period from the initiation timing of the energization indicated by the energization timing signal ST1 received from the timing setting unit 152b to the termination timing of the energization indicated by the de-energization timing signal ST2.

The selection signal generating unit 154 is configured to, in accordance with the rotation speed RS of the internal combustion engine, generate a selection signal SSEL for controlling selection of the intermediate nodes N1 to N4 to be performed by the selecting unit 170b. In the present embodiment, as described above, in the initial state before the internal combustion engine is initiated to rotate, among the plurality of intermediate nodes N1 to N4 set to the primary winding 801 of the ignition coil 800, an intermediate node N1, in which the highest voltage is generated, is selected by the switch SW1 (normally closed switch) of the selecting unit 170b. When the internal combustion engine is initiated to rotate from this initial state, the selection signal generating unit 154 generates a selection signal SSEL that has the selecting unit 170b sequentially select the intermediate nodes N1 to N4 in order from the intermediate node N1 in which the highest pulse voltage is generated among the intermediate nodes N1 to N4 to the intermediate node N4 in which the lowest pulse voltage is generated. The details thereof will be described later.

[Description of Operating Principle]

Next, an operation principle of the ignition control device 100B according to the present embodiment will be described with reference to FIG. 11.

Figure 11:
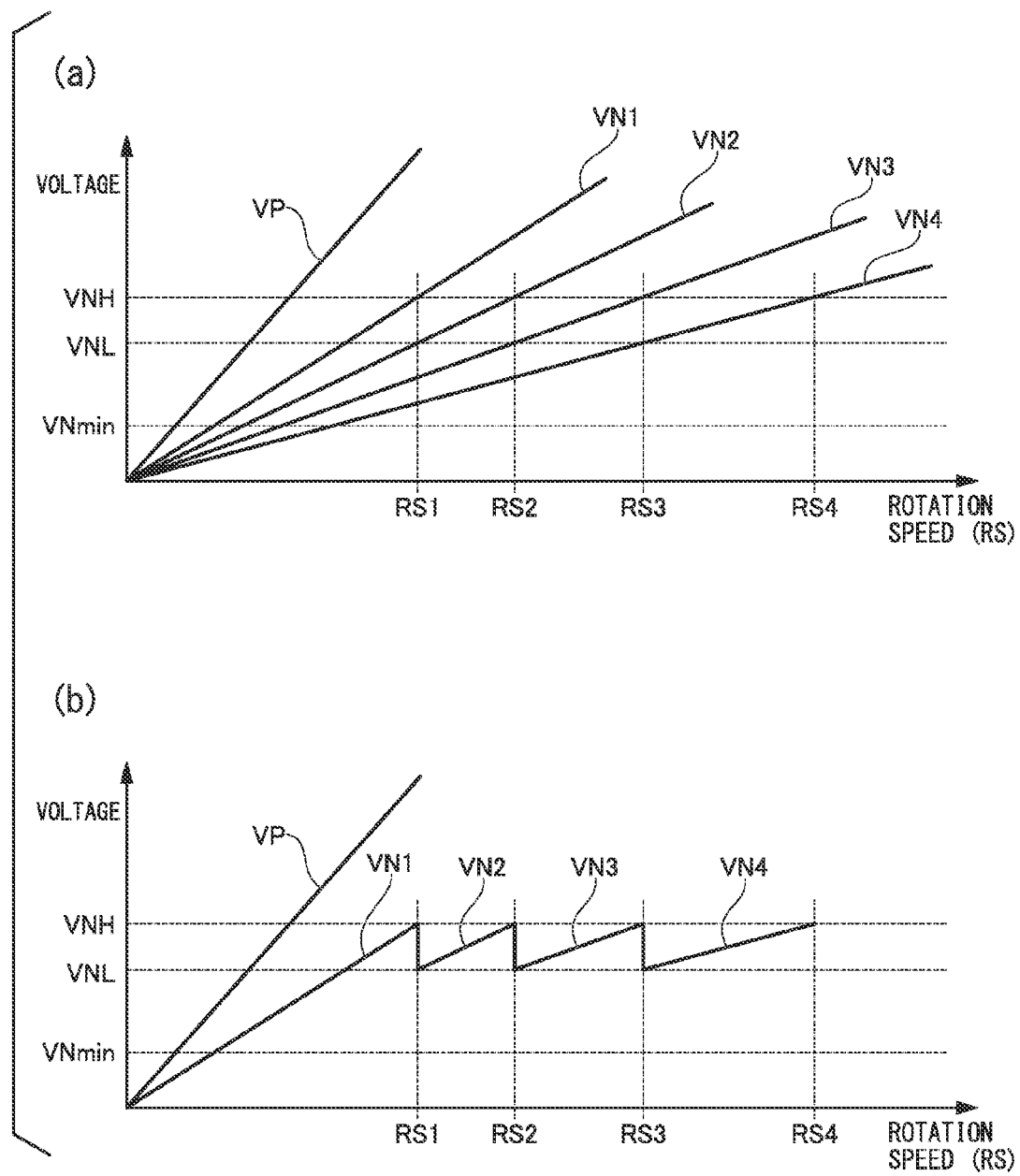
FIG. 11 is an explanatory diagram illustrating an operation principle of the ignition control device according to the third embodiment of the present invention.

FIG. 11 is an explanatory diagram illustrating the operation principle of the ignition control device 100B. Here, FIG. 11(a) shows a correspondence relationship between the rotation speed RS of the internal combustion engine and the voltages VN1 to VN4 and VP which are induced in the primary winding 801 of the ignition coil 800. In the same figure (a), the voltages VN1 to VN4 are voltages of the respective intermediate nodes N1 to N4 of the primary winding 801. Additionally, the voltage VP is the voltage between the positive terminal (+) and the negative terminal (−) of the primary winding 801. Further, the rotation speeds RS1 to RS4 represent the rotation speed RS at the time when the respective voltages VN1 to VN4 reach a predetermined voltage VNH. Among those rotation speeds, the rotation speed RS4 is the target rotation speed of the internal combustion engine. For example, the predetermined voltage VNH is a voltage that does not exceed the withstand voltage of the circuit elements constituting the ignition control device 100B. For example, the predetermined voltage VNL is a voltage that can be optionally set as long as the power generating unit 110b can generate the power supply voltage VDD. For example, the lower limit voltage VNmin is the lower limit of the voltages VN1 to VN4 at which the ignition control device 100B can operate.

As shown in FIG. 11(a), the voltages VN1 to VN4 increase in proportion to the rotation speed RS of the internal combustion engine. Additionally, the voltages VN1 to VN4 one-to-one corresponds to the rotation speed RS. Therefore, if the rotation speed RS is defined, the voltages VN1 to VN4 at that time are also determined uniquely. In the example shown in FIG. 11(a), when the internal combustion engine is initiated to rotate, the rotation speed RS sequentially reaches the rotation speeds RS1 to RS4, and thus the voltages VN1 to VN4 sequentially reach the predetermined voltage VNH. Here, when the rotation speed RS reaches the rotation speed RS1 and the voltage VN1 reaches the predetermined voltage VNH, the voltage VN2 has reached the predetermined voltage VHL. Additionally, when the rotation speed RS reaches the rotation speed RS2 and the voltage VN2 reaches the predetermined voltage VNH, the voltage VN3 has reached the predetermined voltage VHL. Further, when the rotation speed RS reaches the rotation speed RS3 and the voltage VN3 reaches the predetermined voltage VNH, the voltage VN4 has reached the predetermined voltage VHL.

In a case where there is a correspondence relationship among the rotation speed RS and the voltages VN1 to VN4, such as described above, if intermediate nodes in which the voltage VN1 to VN4 are generated are selected while the rotation speed RS is increased, it is possible to obtain a voltage between the predetermined voltage VNL and the predetermined voltage VNH, which is lower than the voltage VP of the pulse induced between the positive terminal (□) and the negative terminal (□) of the primary winding 801. Specifically, as shown in FIG. 11(b), if the intermediate node N1 is selected by the time the rotation speed RS reaches the rotation speed RS1, it is possible to obtain voltage VN1 that increases from the initial voltage (for example, 0V) toward the predetermined voltage VNH. Additionally, if the intermediate node N2 is selected at the time the rotation speed RS reaches the rotation speed RS1, it is possible to obtain the voltage VN2 that drops from the predetermined voltage VNH to the predetermined voltage VNL and thereafter rises again toward the predetermined voltage VNH.

Further, if the intermediate node N3 is selected at the time the rotation speed RS reaches the rotation speed RS2, it is possible to obtain the voltage VN3 that drops from the predetermined voltage VNH to the predetermined voltage VNL and thereafter rises again toward the predetermined voltage VNH. Moreover, if the intermediate node N4 is selected at the time the rotation speed RS reaches the rotation speed RS3, it is possible to obtain the voltage VN4 that drops from the predetermined voltage VNH to the predetermined voltage VNL and thereafter rises again toward the predetermined voltage VNH. Thus, an intermediate node is selected in accordance with the rotation speed RS, thereby obtaining a voltage between the predetermined voltage VNL and the predetermined voltage VNH, which is lower than the voltage VP of the pulse induced in the primary winding 801. If a power supply voltage VDD is generated using that voltage, there becomes no need to use circuit elements with the high voltage specification as circuit elements of the ignition control unit 100B, and to achieve high withstand voltages of circuit elements.

[Description of Operations]

Next, operation of the ignition control device 100B according to the present embodiment will be described.

The operation of the ignition control unit 100B is roughly classified into operation for generating a power supply voltage VDD and ignition operation for causing a high voltage for ignition to be generated in the ignition coil 800. Further, the operation for generating the power supply voltage VDD is classified into operation to be performed by the selecting unit 170b based on the control of the control unit 150b (hereinafter, referred to as "selection operation"), and operation to be performed by the power generating unit 110b (hereinafter, referred to as "power supply operation"). Hereinafter, the selection operation, the power supply operation, and the ignition operation will be sequentially described.

<Select Operation>

Figure 12:
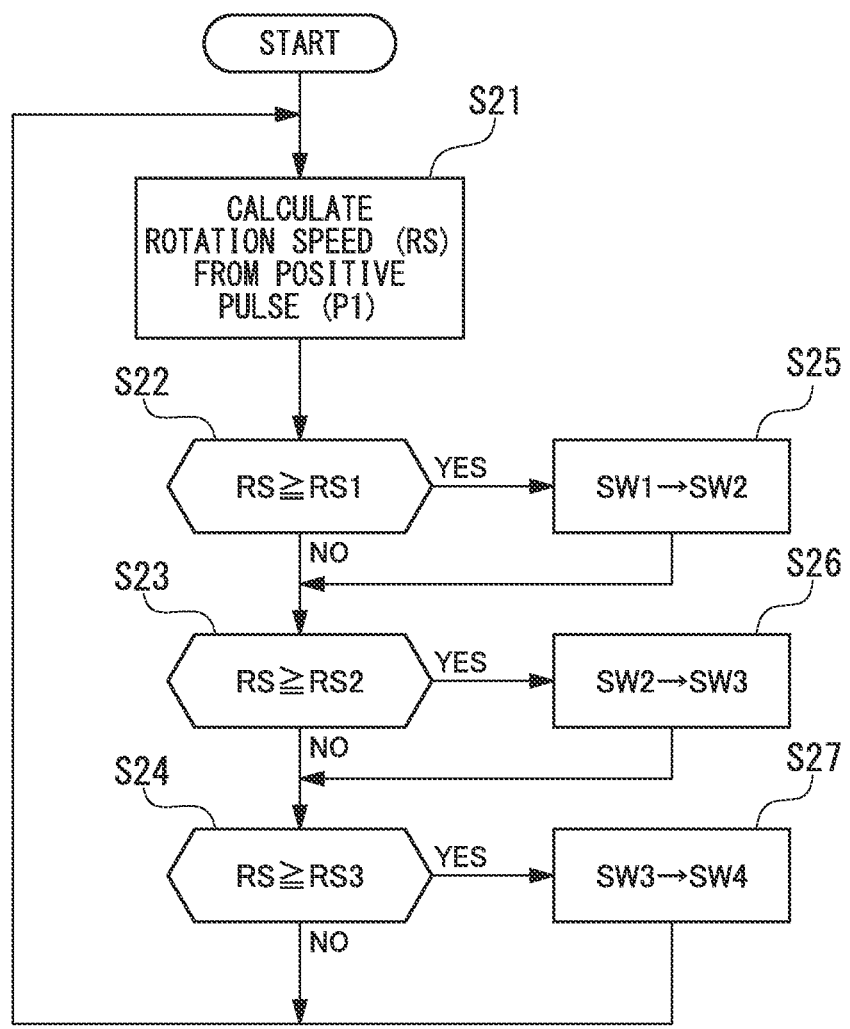
FIG. 12 is a flowchart showing a flow of operation (selection operation) of a selecting unit included in the ignition control device according to the third embodiment of the present invention.
Figure 13:
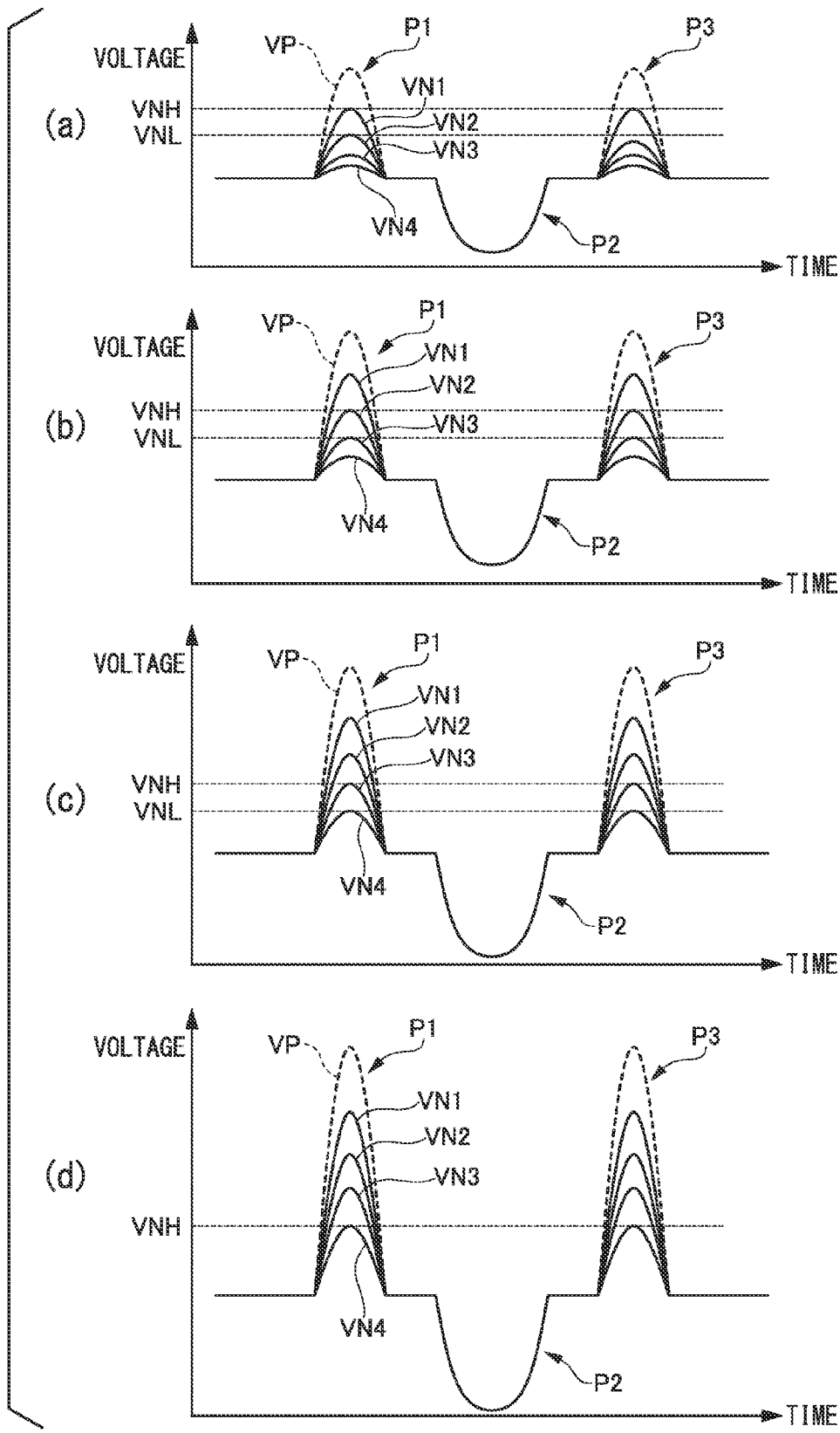
FIG. 13 is a waveform diagram supplementarily illustrating the operation (selection operation) of the selecting unit included in the ignition control device according to the third embodiment of the present invention.

The selection operation to be performed by the selecting unit 170b included in the ignition control device 100B will be described here with reference to FIGS. 12 to 14. Here, FIG. 12 is a flowchart showing a flow of the selection operation to be performed by the selecting unit 170b. FIG. 13 is a waveform diagram for supplementarily describing the selection operation to be performed by the selecting unit 170b included in the ignition control device 100B.

In the initial state before the internal combustion engine is initiated to rotate, the ignition control device 100B is not in the operating state, but the switch SW1 that is the normally closed switch constituting the selecting unit 170b is in the on-state, and the other switches SW2 to SW4 that are the normally open switches are in the off-state. Thus, the intermediate node N1 of the primary winding 801 of the ignition coil 800 is being selected by the selecting unit 170b. Additionally, the intermediate node N1 is connected to the input unit of the power generating unit 110 via the switch SW1 of the selecting unit 170b.

Figure 14:
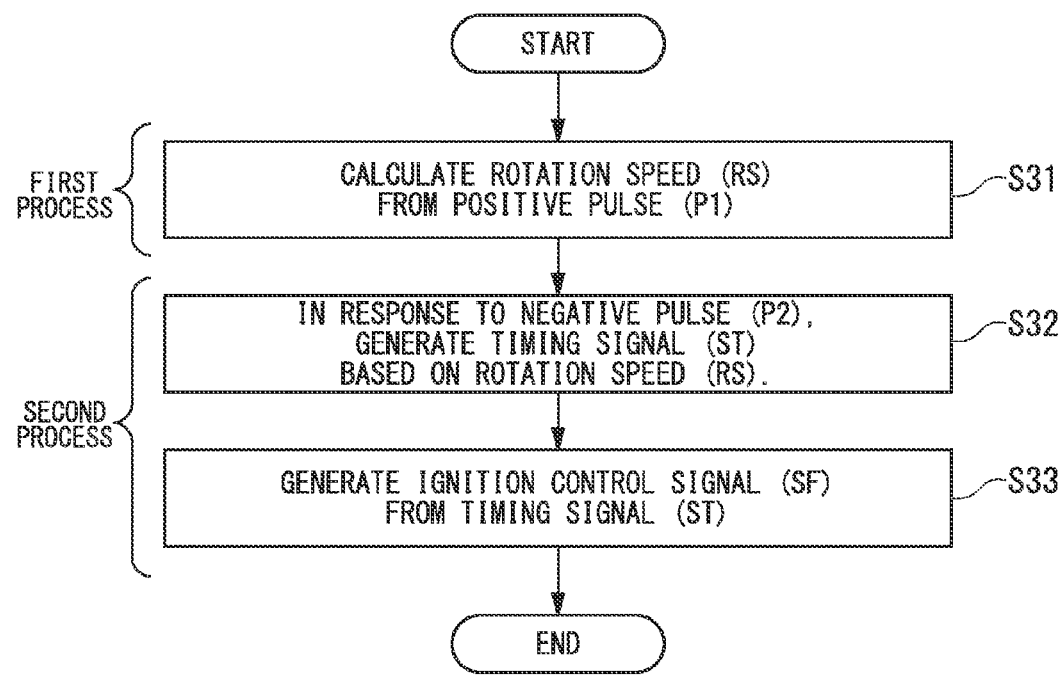
FIG. 14 is a flow chart showing a flow of operation (ignition operation) of the ignition control device according to the third embodiment of the present invention.

When the internal combustion engine is initiated to rotate from the initial state, as illustrated in FIG. 14, the pulse train of the first pulse P1—the second pulse P2—the third pulse P3 is induced as the pulse signal P in the primary winding 801 of the ignition coil 800. Additionally, the voltage VP of the pulse signal P increases as the rotation speed RS is increased. In a state immediately after the internal combustion engine is initiated to rotate, all of the voltages VN1 to VN4 of the pulses of the intermediate nodes N1 to N4 of the primary winding 801 of the ignition coil 800 has not reached the lower limit voltage VNmin shown in above-described FIG. 11 at which the ignition control device 100B is operable. Thereafter, when the rotation speed RS of the internal combustion engine is increased, and the voltage VN1 of the pulse of the intermediate node N1 reaches the minimum voltage VNmin, the lower limit voltage VNmin is supplied to the power generating unit 110b via the switch SW1 of the selecting unit 170b. The power generating unit 110b performs the power supply operation that will be described later and generates the power supply voltage VDD using the voltage VN1 of pulse supplied from the intermediate node N1 via the selecting unit 170b. Then, the power generating unit 110b supplies the generated power supply voltage VDD to the control unit 150b.

When the power supply voltage VDD is supplied from the power generating unit 110b, the control unit 150b enters an operable state, and performs, in each rotation period of the internal combustion engine, process steps S21 to S27 related to control of the selection operation shown in the flowchart of FIG. 12. Specifically, the rotation speed calculating unit 151b constituting the control unit 150b calculates the rotation speed RS of the internal combustion engine from the first pulse P1 included in the positive pulse signal PP supplied from the positive pulse signal generating unit 120b (step S21). Specifically, the rotation speed calculating unit 151b detects the period T of the first pulse P1, and calculates the rotation speed RS of the internal combustion engine from the period T of the first pulse P1.

Subsequently, the selection signal generating unit 154 constituting the control unit 150b controls the switches SW1 to SW4 of the selecting unit 170b based on the rotation speed RS calculated by the rotation speed calculating unit 151b, thereby alternatively selecting the intermediate nodes N1 to N4 of the primary winding 801 of the ignition coil 800. Specifically, the selection signal generating unit 154 compares a predetermined rotation speed RS1 and the rotation speed RS calculated by the rotation speed calculating unit 151b, and determines whether or not the rotation speed RS is larger than or equal to the rotation speed RS1 (step S22).

If the rotation speed RS is not larger than or equal to the rotation speed RS1 (step S22: NO), that is, if the rotation speed RS has not reached the rotation speed RS1, the selection signal generating unit 144 determines whether or not the rotation speed RS is larger than or equal to the rotation speed RS2 (step S23). In the control cycle in the current rotation period, the rotation speed RS has not yet reached the rotation speed RS1 that is lower than the rotation speed RS2, the selection signal generating unit 154 determines that the rotation speed RS is not larger than or equal to the rotation speed RS2 (step S23: NO).

If the rotation speed RS is not larger than or equal to the rotation speed RS2 (step S22: NO), that is, the rotation speed RS has not reached the rotation speed RS2, the selection signal generating unit 154 determines whether or not the rotation speed RS is larger than or equal to the rotation speed RS3 (step S24). In the present control cycle, the rotation speed RS has not yet reached the rotation speeds RS1 and RS2 that are lower than the rotation speed RS3. For this reason, the selection signal generating unit 154 determines that the rotation speed RS is not larger than or equal to the rotation speed RS3 (step S24: NO). Thereafter, the selection signal generating unit 154 returns the processing to step S21 and calculates the rotation speed RS in the new rotation cycle, thereby repeating the same determination process.

Here, when the rotation speed RS reaches the rotation speed RS1, as illustrated in FIG. 13(*a*), the voltage VN1 of the pulse of the intermediate node N1 reaches the predetermined voltage VNH. In this case, the selection signal generating unit 154 determines that the rotation speed RS is larger than or equal to the rotation speed RS1 (step S22: YES). Then, the selection signal generating unit 154 generates a selection signal SSEL for turning on the switch SW2 constituting the selecting unit 170*b* and turning off the switches SW1, SW3, and SW4. Then, the selection signal generating unit 154 outputs the generated selection signal SSEL to the selecting unit 170*b*.

Based on the selection signal SSEL supplied from the selecting unit 170*b*, the selecting unit 170*b* turns off the switch SW1 and turns on the switch SW2, and maintains the off-state of the switches SW3 and SW4. Thus, the switch SW1 is switched to the switch SW2, and the intermediate node N2 is selected by the selecting unit 170 in place of the intermediate node N1. The voltage VN2 of the pulse of the intermediate node N2 selected by the selecting unit 170*b* is supplied to the common terminal TCOM via the switch SW2 and then is supplied to the power generating unit 110*b* via the common terminal TCOM. In this case, the voltage supplied to the input unit of the power generating unit 110*b* drops from the predetermined voltage VNH (VN1) to the predetermined voltage VNL (VN2), and thereafter starts to rise toward the predetermined voltage VNH.

Thereafter, the selection signal generating unit 154 sequentially determines in steps S23 and S24 whether or not the rotation speed RS is larger than or equal to the rotation speeds RS2 and RS3, respectively. In this determination cycle, however, the rotation speed RS has not reached the rotation speeds RS2 and RS3. For this reason, the selection signal generating unit 154 does not perform steps S26 and S27, and returns the processing to step S21. Then, the selection signal generating unit 154 calculates the rotation speed RS in a new rotation cycle, thus repeating the same determining process.

Subsequently, when the rotation speed RS reaches the rotation speed RS2, as illustrated in FIG. 13(*b*), the voltage VN2 of the pulse of the intermediate node N2 reaches the predetermined voltage VNH. In this case, the selection signal generating unit 154 determines that the rotation speed RS is larger than or equal to the rotation speed RS2 (step S23: YES). Then, the selection signal generating unit 154 generates a selection signal SSEL for turning on the switch SW3 constituting the selecting unit 170*b* and turning off the other switches SW1, SW2, and SW4. Then, the selection signal generating unit 154 outputs the generated selection signal SSEL to the selecting unit 170*b*.

Based on the selection signals SSEL supplied from the selecting unit 170*b*, the selecting unit 170*b* turns off the switch SW2, turns on the switch SW3, and maintains the off-state of the switches SW1 and SW4. Thus, the switch SW2 is switched to the switch SW3, and the intermediate node N3 is selected by the selecting unit 170*b* in place of the intermediate node N2. The voltage VN3 of the pulse of the intermediate node N3 selected by the selecting unit 170*b* is supplied to the common terminal TCOM via the switch SW3, and then is supplied to the power generating unit 110*b* via the common terminal TCOM. Also in this case, similar to the above, the voltage supplied to the input unit of the power generating unit 110*b* drops from the predetermined voltage VNH (VN2) to the predetermined voltage VNL (VN3), and thereafter starts to rise toward the predetermined voltage VNH.

Thereafter, the selection signal generating unit 154 sequentially determines in steps S24 whether or not the rotation speed RS is larger than or equal to the rotation speed RS3. In this determination cycle, however, the rotation speed RS has not reached the rotation speed RS3. For this reason, the selection signal generating unit 154 does not perform step S27, and returns the processing to step S21. Then, the selection signal generating unit 154 calculates the rotation speed RS in a new rotation cycle, thus repeating the same determining process.

Subsequently, when the rotation speed RS reaches the rotation speed RS3, as illustrated in FIG. 13(*c*), the voltage VN3 of the pulse of the intermediate node N3 reaches the predetermined voltage VNH. In this case, the selection signal generating unit 154 determines that the rotation speed RS is larger than or equal to the rotation speed RS3 (step S24: YES). Then, the selection signal generating unit 154 generates a selection signal SSEL for turning on the switch SW4 constituting the selecting unit 170*b* and turning off the other switches SW1, SW2, and SW3. Then, the selection signal generating unit 154 outputs the generated selection signal SSEL to the selecting unit 170*b*.

Based on the selection signal SSEL supplied from the selecting unit 170*b*, the selecting unit 170*b* turns off the switch SW3, turns on the switch SW4, and maintains the off-state of the switches SW1 and SW2. Thus, the switch SW3 is switched to the switch SW4, and the intermediate node N4 is selected by the selecting unit 170*b* in place of the intermediate node N3. The voltage VN4 of the pulse of the intermediate node N4 selected by the selecting unit 170*b* is supplied to the common terminal TCOM via the switch SW4, and then is supplied to the power generating unit 110*b* via the common terminal TCOM. Also in this case, similar to the above, the voltage supplied to the input unit of the power generating unit 110*b* drops from the predetermined voltage VNH (VN3) to the predetermined voltage VNL (VN4), and thereafter starts to rise toward the predetermined voltage VNH.

Thereafter, when the rotation speed RS reaches the target rotation speed RS4, as illustrated in FIG. 13(*d*), the voltage VN4 of the pulse of the intermediate node N4 reaches the predetermined voltage VNH. Thereafter, unless the rotation speed RS becomes below the rotation speeds RS1, RS2, and RS3, the states of the respective switches of the selecting unit 170*b* are maintained. Thus, the voltage VN4 of the pulse of the intermediate node N4 is supplied to the generator 110*b* via the switch SW4 of the selecting unit 170*b*. Then, the power generating unit 110*b* generates a power supply voltage VDD using the voltage VN4 of the pulse of the intermediate node N4 and supplies the generated power supply voltage VDD to the control unit 150*b*.

As described above, according to the present embodiment, the switches SW1 to SW4 of the selecting unit 170*b* are switched in accordance with the increase in the rotation speed RS of the internal combustion engine. Thereby, a target to be selected by the selecting unit 170b is sequentially switched from the intermediate node at the high voltage to the intermediate node at the low voltage. Thus, the voltage of the pulse to be input to the power generating unit 110b via the selecting unit 170b is reduced to the predetermined voltage VNH or less. Therefore, there becomes no need to use circuit elements with high withstand voltage specification as circuit elements of the power generating unit 110b. Additionally, there becomes no need to achieve high withstand voltage of circuit elements. Further, the power supply voltage VDD generated by the power generating unit 110b is a low voltage (for example, 5V) suitable for the control unit 150b, and the high withstand voltage of the circuit elements constituting the control unit 150b is not required.

Here, in the above-described determination in steps S22, S23, and S24, a case where the rotation speed RS calculated by the rotation speed calculating unit 151b exceeds the rotation speed RS1 can be considered. Therefore, strictly speaking, the voltage of the pulse to be input to the power generating unit 110b via the selecting unit 170b is kept less than or equal to the voltage obtained by adding to the predetermined voltage VNH, the voltage (excess amount) corresponding to the above excess rotation speed. This excess amount can be recognized in advance. Therefore, the predetermined voltage VNH is preferably set in consideration of that excess amount.

Additionally, according to the present embodiment, after the rotation speed RS reaches the target rotation speed RS4, the pulse voltages VN1 to VN3 exceeding the predetermined voltage VNH are applied to one ends of the switches SW1 to SW3 constituting the selecting unit 170b. However, the differential voltage between each intermediate node is merely applied between the input and output contact points of each of the switches SW1 to SW3. For example, when the switch SW1 is in the on-state, the differential voltage between the input contact point (contact point connected to the intermediate node N1) and the output contact point (contact point connected to the common terminal TCOM) of the switch SW1 is almost zero if an internal resistance element of the switch SW1 is small enough. At this time, the output contact point of the switch SW2 is applied with the voltage VN1 of the pulse of the intermediate node N1 via the switch SW1, and the input contact point of the switch SW2 is applied with the voltage VN2 of the pulse of the intermediate node N2.

Therefore, the differential voltage between the input and output contact points of the switch SW2 remain in the differential voltage between the voltage VN1 of the pulse of the intermediate node N1 and the voltage VN2 of the pulse of the intermediate node N2. The same applies to the other switches, and the differential voltage between the input and output contact points thereof is the voltage sufficiently smaller than the voltage VP between the positive terminal (+) and the negative terminal (−) of the primary winding 801. For this reason, the high withstand voltages of the switches SW1 to SW4 are not required.

Therefore, according to the present embodiment, it is possible to suppress an increase in the size of the device and reduce the cost without requiring the high withstand voltages of the circuit elements constituting the ignition control unit 100B.

Additionally, according to the present embodiment, the excess pulse voltage is not input to the power generating unit 110b, thereby making it possible to stabilize the operation of the ignition control unit 100B, and thus improving the starting performance of the internal combustion engine.

<Power Supply Operation>

Next, the power supply operation (i.e., operation of the power generating unit 110b) will be described with reference to FIG. 9.

The voltages VN1 to VN4 of the intermediate nodes selected by the above-described selecting unit 170b (hereinafter, referred to as "input voltage VN") are supplied to an input terminal TIN forming the input unit of the power generating unit 110b. The input voltage VN is supplied to the cathode of the zener diode 113 via a resister element 111 and a diode D. If the input voltage VN is higher than the breakdown voltage of the zener diode 113, the zener diode 113 breaks down, and the input voltage VN is clamped at a constant voltage.

Here, the resistor 111 limits the breakdown current when the zener diode 113 has broken down. The diode 112 suppresses the reverse flow of current caused by the input voltage VN. The capacitor 114 stabilizes the potential of the cathode of the zener diode 113. The voltage regulator circuit 115 lowers the constant voltage obtained by the zener diode 113 clamping the input voltage VN, and thereby generates the desired power supply voltage VDD. The power supply voltage VDD generated by the voltage regulator circuit 115 is stabilized by the capacitor 116, and is supplied to the control unit 150b via the output terminal TOUT.

In the above-described power supply operation, the input terminal TIN of the power generating unit 110b is supplied with the voltages VN1 to VN4 of the pulses of the intermediate nodes N1 to N4 of the primary winding 801, which are selected by the selecting unit 170b. The voltages VN1 to VN4 of the pulses of the intermediate nodes selected by the selecting unit 170b are voltages that are smaller than or equal to the predetermined voltage VNH (or slightly exceeds the voltage), that is, voltages not exceeding the withstand voltages of the circuit elements of the ignition control device 100B including the circuit elements of the power generating unit 110b. For this reason, a high voltage pulse is never supplied to the power generating unit 110b. Therefore, the high withstand voltages of the circuit elements constituting the ignition control device 100B including the power generating unit 110b are not required.

<Ignition Operation>

Next, the ignition operation of the ignition control unit 100B will be described with reference to a timing chart of FIG. 15 along a flow shown in FIG. 14. Here, FIG. 14 is a flowchart showing a flow of processing of the control unit 150b concerning the ignition operation of the ignition control unit 100B. FIG. 15 is a timing chart supplementarily illustrating the ignition operation of the ignition control device 100B.

Here, in the present embodiment, description will be given taking as an example a case where the ignition operation is performed in response to the first pulse P1 and the second pulse P2. Hereinafter, a process related to operation to be performed in response to the first pulse P1 is referred to as a first process, and a process related to operation to be performed in response to the second pulse P2 is referred to as a second process.

When the internal combustion engine is initiated to rotate, as illustrated in FIG. 14, a pulse train of the first pulse P1—the second pulse P2—the third pulse P3 is induced in the primary winding 801 of the ignition coil 800, as a pulse signal P. As described above, the power generating unit 110b generates the power supply voltage VDD using the voltages VN1 to VN4 of the pulses of the intermediate nodes N1 to N4 at the time when the first pulse P1 or the third pulse P3, which is a positive pulse, is induced in the primary winding 801 of the ignition coil 800. Then, the power generating unit 110*b* supplies the generated power supply voltage VDD to the control unit 150*b*.

The positive pulse signal generating unit 120*b* and the negative pulse signal generating unit 140*b* respectively detects and generates a positive pulse signal PP and a negative pulse signal PN from the pulse signal P induced in the primary winding 801 of the ignition coil 800. In other words, the positive pulse signal generating unit 120*b* detects the first pulse P1 and the third pulse P3, which are positive pulses, from the pulse signal P. Then, the positive pulse signal generating unit 120*b* generates the positive pulse signal PP including the first pulse P1 and the third pulse P3, and outputs the generated positive pulse signal PP to the control unit 150*b*. Additionally, the negative pulse signal generating unit 140*b* detects from the pulse signal P, the second pulse P2 that is a negative pulse. Then, the negative pulse signal generating unit 140*b* generates the negative pulse signal PN including the second pulse P2, and outputs the generated negative pulse signal PN to the control unit 150*b*.

The control unit 150*b* performs the first process in response to the first pulse P1 included in the positive pulse signal PP. In the first process, the control unit 150*b* operates using the power supply voltage VDD supplied from the power generating unit 110*b*. Additionally, the control unit 150*b* calculates the rotation speed RS of the internal combustion engine in response to the first pulse P1 included in the positive pulse signal PP (step S31). Specifically, at time t2 when the current rotation period starts in response to the first pulse P1, the rotation speed calculating unit 151 constituting the control unit 150*b* detects a time interval from the leading edge (rising edge) of the first pulse P1 in the previous rotational period to the leading edge (rising edge) of the first pulse P1 in the current rotation period, that is, the period T of the first pulse P1. Thereby, the rotation speed calculating unit 151 calculates the rotation speed RS of the internal combustion engine from the period T of the first pulse P1. The calculation of the rotation speed RS is the same as the calculation of the rotation speed RS of the above-described selection operation.

Subsequently, the control unit 150*b* performs the second process in response to the second pulse P2 included in the negative pulse signal PN. In the second process, the control unit 150*b* operates using the power supply voltage VDD supplied from the power generating unit 110*b*. Additionally, the control unit 150*b* sets an initiation timing of energization, and sets a termination timing of the energization based on the rotation speed RS. Then, the control unit 150*b* generates an ignition control signal SF to control the initiation and termination of the energization of the ignition coil 800 (steps S32, S33). Specifically, at time t3 in the current rotation period, in response to the leading edge of the second pulse P2, the timing setting unit 152*b* constituting the control unit 150*b* generates an energization timing signal ST1 indicating the initiation timing of the energization of the ignition coil 800 (step S32). In the present embodiment, the timing setting unit 152*b* outputs as the energization timing signal ST1, a signal that transitions from the low-level signal to a high-level signal at the time t3a.

Here, in the example shown in FIG. 15, the energization timing signal ST1 transitions from the low-level signal to the high-level signal at the time t3a after the leading edge of the second pulse P2 at the time t3. However, the time interval from the time t3 to the time t3a corresponds to, for example, a delay time of the processing performed by the control unit 150*b*. Therefore, if the delay of the processing performed by the control unit 150*b* is small, the energization timing signal ST1 immediately transitions in response to the leading edge (falling edge) of the second pulse P2 at the time t3. Here, the timing at which the energization timing signal ST1 transitions from the low level signal to the high level signal is optional as long as it is possible to save an energization time for storing in the ignition coil 800, the energy required for ignition (discharge of the plug 900).

Additionally, at the time t3 in the current rotational period, in response to the leading edge of the second pulse P2 included in the negative pulse signal PN, the timing setting unit 152*b* generates based on the rotation speed RS, a de-energization timing signal ST2 indicating a timing of terminating the energization of the ignition coil 800 (step S32). In the present embodiment, the timing setting unit 152*b* outputs, as the de-energization timing signal ST2, a signal that transitions from the low level signal to a high level signal at time t4. The de-energization timing indicated by the de-energization timing signal ST2 is a desired timing preset as the ignition timing in accordance with the rotation speed RS of the internal combustion engine.

For example, data indicating the de-energization timing is stored in the timing setting unit 152*b* in tabular form, in association with the rotation speed RS. The timing setting unit 152*b* refers to the table based on the rotation speed RS, thereby obtaining the de-energization timing. However, the configuration is not limited to this example. The de-energization timing may be obtained using another technique, such as calculating the energization timing from the rotation speed RS using a mathematical expression describing a correspondence relationship between the rotation speed RS and the de-energization timing, which is defined in the above table.

In the present embodiment, the de-energization timing obtained from the above table is set as, for example, a timer value, using the timer function of the microcomputer. In other words, in response to the leading edge of the second pulse P2, the timing setting unit 152*b* sets to the timer, a timer value indicating the de-energization timing in accordance with the rotation speed RS. With reference to the timer, the timing setting unit 152*b* has the signal level of the de-energization timing signal ST2 transition from the low level to the high level. Generally, the microcomputer operates in synchronization with a predetermined system clock. For example, even if the system clock is varied due to a change in ambient temperature, a variation of the timer remains within the variation range of the system clock. For this reason, even if the ambient temperature changes, it is possible to suppress a variation in the de-energization timing, and therefore stabilize the ignition timing.

Additionally, in the present embodiment, the de-energization timing is set so that, for example, as the rotation speed RS is higher, a time interval from the time t3 corresponding to the leading edge (falling edge) of the second pulse P2 shown in FIG. 15 to the time t4 corresponding to the ignition timing is shorter, in accordance with the advanced amount of the time at which the piston of the internal combustion engine reaches the top dead center. Conversely, the de-energization timing is set so that as the rotation speed RS is lower, the time interval from the time t3 to the time t4 is longer, in accordance with the delayed amount of the time at which the piston of the internal combustion engine reaches the top dead center. In other words, the de-energization timing is controlled so that the rotational angle corresponding to the ignition timing becomes substantially constant.

Therefore, it is possible to stabilize the ignition timing in accordance with the rotation speed RS, even if the rotation speed RS is varied. The configuration is not limited to the above-described example, and a correspondence relationship between the de-energization timing and the rotation speed RS may be optionally set.

Subsequently, the signal generating unit 153b constituting the control unit 150b generates and outputs the ignition control signal SF from the energization timing signal ST1 and the de-energization timing signal ST2 (step S33). In the present embodiment, the signal generating unit 153b generates, as the ignition control signal SF, a signal that maintains at the low level during the time interval from the time t3 a at which the energization timing signal ST1 transitions from the low level signal to the high level signal to the time t4 at which the de-energization timing signal ST2 transitions from the low level signal to the high level signal. The period during which the ignition control signal SF is at the low level corresponds to the period during which the ignition coil 800 is kept in the energized state. However, the configuration is not limited to this example, and a signal format of the ignition control signal SF is optional as long as the period during which the ignition coil 800 is kept in the energized state can be specified.

The control unit 150b performs the first process (step S31) and the second process (steps S32, S33) as described above, thereby generating an ignition control signal SF. Then, the control unit 150b outputs the generated ignition control signal SF to the driving unit 160b. The driving unit 160b outputs the driving signal SD in response to the ignition control signal SF received from the control unit 150b. In the present embodiment, the driving unit 160b outputs a high level signal as the level of the driving signal SD when the ignition control signal SF is at a low level. Conversely, when the ignition control signal SF is at the high level, the driving unit 160b outputs a low level signal as the signal level of the driving signal SD.

At the time t3 a, when the ignition control signal SF becomes at the low level, the driving signal SD becomes at the high level in response thereto. The switching element 180 is turned on based on the driving signal SD at the high level received from the driving unit 160b. At this time, the second pulse P2 of the negative pulse PN is induced in the primary winding 801 of the ignition coil 800. For this reason, the current IF caused by the second pulse P2 (FIG. 2) flows in a closed loop formed by the ignition switching element 180 and the primary winding 801 of the ignition coil 800. Thus, energization of the ignition coil 800 is initiated, thereby storing energy in the primary winding 801.

Thereafter, the ignition control signal SF becomes at the high level at the time t4. When the driving signal SD becomes at the low level in response thereto, the switching element 180 is turned off. Thereby, the current IF having been flowing in the primary winding 801 of the ignition coil 800 is interrupted, and thus the energization of the ignition coil 800 is terminated. At this time, due to the inductance of the primary winding 801, a high voltage (for example, 200V) proportional to the amount of a change in the current IF is generated between the terminals of the primary winding 801. The high voltage generated in the primary winding 801 causes another high voltage (voltage at which the spark plug 900 is dischargeable) in accordance with the turns ratio between the primary winding 801 and the secondary winding 802 to be induced in the secondary wiring 802. The high voltage of the secondary winding 802 is applied to the spark plug 900, thereby causing the spark plug 900 to discharge. When the spark plug 900 is discharged, the fuel mixture in the cylinder of the internal combustion engine is ignited by the discharge.

The operation (selection operation, power supply operation, ignition operation) of the ignition control device 100B according to the first embodiment has been described above.

Here, it has been assumed in the above-described first embodiment that the rotation speed RS is calculated in the first process to be performed in response to the leading edge of the first pulse P1, but the configuration is not limited to this example. The rotation speed RS may be calculated in response to the trailing edge of the first pulse P1. Alternatively, the rotation speed RS may be calculated in the second process to be performed in response to the second pulse P2.

Additionally, it has been assumed in the above-described first embodiment that the initiation and termination timings of energization are set in response to the leading edge of the second pulse P2, but the configuration is not limited to this example. The initiation or termination timing of energization may be set in the first process to be performed in response to the first pulse P1.

Further, according to the above-described third embodiment, the present invention has been expressed as the ignition control device 100B. However, the present invention can also be expressed as an ignition control method. In this case, an ignition control method according to the present invention can be expressed as, for example, an ignition control method of causing a voltage to be supplied to the spark plug 900, to be generated in the ignition coil 800, based on a pulse signal P induced in the ignition coil 800 in accordance with rotation of the internal combustion engine. The ignition control method includes: a step for the control unit 150b to have the selecting the 170b select one of a plurality of intermediate nodes N1 to N4 set to the ignition coil 800 in accordance with the rotation speed RS of the internal combustion engine; and a step for the power generating unit 110b to generate an operation power supply voltage VDD of the ignition control unit 100B from a voltage of the intermediate node selected by the selecting unit 170b.

Fourth Embodiment

A fourth embodiment of the present invention will be described with reference to FIG. 16.

Figure 16:
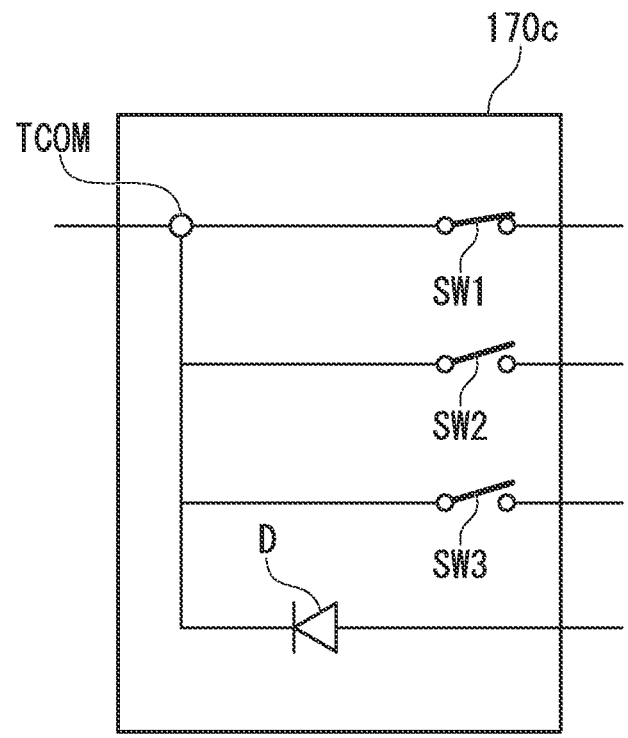
FIG. 16 is a diagram showing an example of a configuration of a selecting unit included in an ignition control device according to a fourth embodiment of the present invention.

Here, FIG. 16 is a diagram showing an example of a configuration of a selecting unit included in an ignition control device according to the fourth embodiment of the present invention.

The ignition control device according to the fourth embodiment has the configuration of the ignition control device 100B according to the third embodiment shown in above-described FIG. 8, in which a selecting unit 170c shown in FIG. 16 is included in lieu of the selecting unit 170b. The selecting unit 170c includes a diode D in lieu of the switch SW4 among the switches SW1 to SW4 shown in FIG. 8 where the switch SW4 is connected to the intermediate node N4 to which a positive pulse at the lowest voltage among the intermediate nodes N1 to N4 is induced. Here, an anode of the diode D is connected to the intermediate node N4 of the primary winding 801 of the ignition coil 800. A cathode of the diode D is connected to the common terminal TCOM. The other configuration is the same as that of the third embodiment.

According to the selecting unit 170c, after the rotation speed RS of the internal combustion engine has reached a target rotation speed RS4, the control unit 150b merely has to control only the switch SW1, which is a normally closed switch, to be turned off. Since the other switches SW2 and SW3 are normally open switches, the other switches are kept turned off unless being actively controlled to be turned on. For this reason, it is possible to simplify the control of the selecting unit 170c by the control unit 150b, compared to the third embodiment, thereby reducing the processing load of the control unit 150b. Additionally, similar to the third embodiment, it is possible to suppress an increase in the size of the device and reduce the cost, without requiring the high withstand voltage of the circuit elements constituting the ignition control unit 100B. Further, similar to the third embodiment, an excess pulse voltage is not input to the power generating unit 110b, thereby making it possible to stabilize the operation of the ignition control device, thereby improving the starting performance of the internal combustion engine.

Although the third embodiment and the fourth embodiment of the present invention have been described, but the present invention is not limited to the above embodiments, and variations, changes, modifications, substitutions, and the like can be made in various ways without departing from the scope of the present invention. For example, it has been assumed in the above-described third embodiment that the intermediate nodes N1 to N4 are selected by the selecting unit 170b in accordance with the rotation speed RS of the internal combustion engine. However, the intermediate nodes N1 to N4 may be selected in accordance with the voltage VP of the pulse induced in the primary winding 801 of the ignition coil 800 or the voltages VN1 to VN4.

INDUSTRIAL APPLICABILITY

The present invention is applicable to an ignition control device and an ignition control method for an internal combustion engine.

DESCRIPTION OF REFERENCE NUMERALS 100A, 100B: ignition control device
110a, 110b: power generating unit
120a, 120b: positive pulse signal generating unit
130: state detecting unit
131: dummy transistor
140a, 140b: negative pulse signal generating unit (current detecting unit)
150a, 150b: control unit
151a, 151b: rotation speed calculating unit
152a, 152b: timing setting unit
153a, 153b: signal generating unit
154: selection signal generating unit
160a, 160b: driving unit
170a: biasing unit
170b, 170c: selecting unit
180: switching element
800: ignition coil
900: ignition plug
S11 to S15, S21 to S27, S31 to S33: process step

The invention claimed is:

1. An ignition control device configured to, based on a pulse signal to be induced in an ignition coil in accordance with rotation of an internal combustion engine, cause a voltage to be supplied to an ignition plug included in the internal combustion engine, to be generated in the ignition coil, the ignition control device comprising:
a switching element configured to energize the ignition coil;
a biasing unit configured to bias control terminals of the switching element so that the switching element is turned on when the pulse signal is induced;
a state detecting unit configured to detect a biased state of the switching element; and
a control unit configured to set a timing for controlling de-energization of the ignition coil in response to a result of detection performed by the state detecting unit, and to generate an ignition control signal for controlling the switching element to be turned off in accordance with the timing, wherein
the biasing unit includes a resistor element connected between a base and a collector of a transistor included in the switching element,
the state detecting unit includes a dummy transistor configured to simulate a collector current of the transistor included in the switching element, and
a base and an emitter of the dummy transistor are connected directly to the base and an emitter of the transistor included in the switching element, respectively.

2. The ignition control device according to claim 1, wherein the state detecting unit is configured to detect the biased state of the switching element from a voltage between the base and the emitter of the transistor included in the switching element, or a direction of a current flowing through the ignition coil.

3. The ignition control device according to claim 1, wherein the transistor included in the switching element comprises a multi-stage Darlington transistor.

4. The ignition control device according to claim 1, wherein the pulse signal is a negative pulse to be induced in a primary winding of the ignition coil in accordance with the rotation of the internal combustion engine.

5. The ignition control device according to claim 1, further comprising:
a power generating unit configured to generate from the pulse signal to be induced in the ignition coil, a power supply voltage required for the ignition control device to operate;
a first pulse signal generating unit configured to generate a first pulse from the pulse signal to be induced in the ignition coil;
a second pulse signal generating unit configured to generate from a result of detection performed by the state detecting unit, a second pulse following the first pulse; and
a driving unit configured to drive the switching unit based on the ignition control signal, wherein
the control unit is configured to generate the ignition control signal in response to the first pulse and the second pulse.

6. An ignition control method for an ignition control device to, based on a pulse signal to be induced in an ignition coil in accordance with rotation of an internal combustion engine, cause a voltage to be supplied to an ignition plug included in the internal combustion engine, to be generated in the ignition coil, the ignition control method comprising:
biasing, by a biasing unit of the ignition control device, control terminals of a switching element of the ignition control device configured to energize the ignition coil, so that the switching element is turned on when the pulse signal is induced;
detecting, by a state detecting unit of the ignition control device, a biased state of the switching element;

setting, by a control unit of the ignition control device, a timing for controlling de-energization of the ignition coil in response to a result of the detection; and generating, by the control unit of the ignition control device, an ignition control signal for controlling the switching element to be turned off in accordance with the timing, wherein the biasing unit includes a resistor element connected between a base and a collector of a transistor included in the switching element, the state detecting unit includes a dummy transistor configured to simulate a collector current of the transistor included in the switching element, and a base and an emitter of the dummy transistor are connected directly to the base and an emitter of the transistor included in the switching element, respectively.

\* \* \* \* \*